United States Patent
Kogawa et al.

(10) Patent No.: US 8,175,187 B2
(45) Date of Patent: May 8, 2012

(54) WIRELESS COMMUNICATION APPARATUS FOR SUPPRESSING INTERFERENCE WHILE REDUCING TRANSMISSION DELAY

(75) Inventors: Tsuyoshi Kogawa, Kawagawa (JP); Kiyoshi Toshimitsu, Shibuya-ku (JP); Takafumi Sakamoto, Machida (JP); Koji Ogura, Tachikawa (JP); Shoji Otaka, Yokohama (JP); Toshiyuki Umeda, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 310 days.

(21) Appl. No.: 12/560,090

(22) Filed: Sep. 15, 2009

(65) Prior Publication Data

US 2010/0215116 A1    Aug. 26, 2010

(30) Foreign Application Priority Data

Feb. 24, 2009  (JP) ................... 2009-041110

(51) Int. Cl.
*H04L 27/00* (2006.01)
*H03C 5/00* (2006.01)
(52) U.S. Cl. ...................................... 375/295
(58) Field of Classification Search .............. 375/295, 375/269, 268, 259
See application file for complete search history.

(56) References Cited

U.S. PATENT DOCUMENTS

| | | | |
|---|---|---|---|
| 2002/0001113 A1* | 1/2002 | Fuse | 359/115 |
| 2008/0002615 A1* | 1/2008 | Nakajima et al. | 370/328 |
| 2008/0146263 A1* | 6/2008 | Shiouchi et al. | 455/517 |

FOREIGN PATENT DOCUMENTS

JP    2008-153807    7/2008

* cited by examiner

*Primary Examiner* — David C. Payne
*Assistant Examiner* — Brian J Stevens
(74) *Attorney, Agent, or Firm* — Oblon, Spivak, McClelland, Maier & Neustadt, L.L.P.

(57) ABSTRACT

A wireless communication apparatus for performing communication using a first communication scheme which transmits a signal using amplitude shift keying and a second communication scheme which suppresses communication with others except a communication counterpart by transmitting a transmission suppression signal before communication is started. The apparatus includes: a first signal generation unit configured to generate transmission data; a modulation unit configured to generate first and second signals having different amplitudes by amplitude-shift keying the transmission data; a second signal generation unit configured to generate the transmission suppression signal having a signal length corresponding to that of the first signal; and a transmission unit configured to transmit the transmission suppression signal at the timing when the first signal is transmitted.

11 Claims, 18 Drawing Sheets

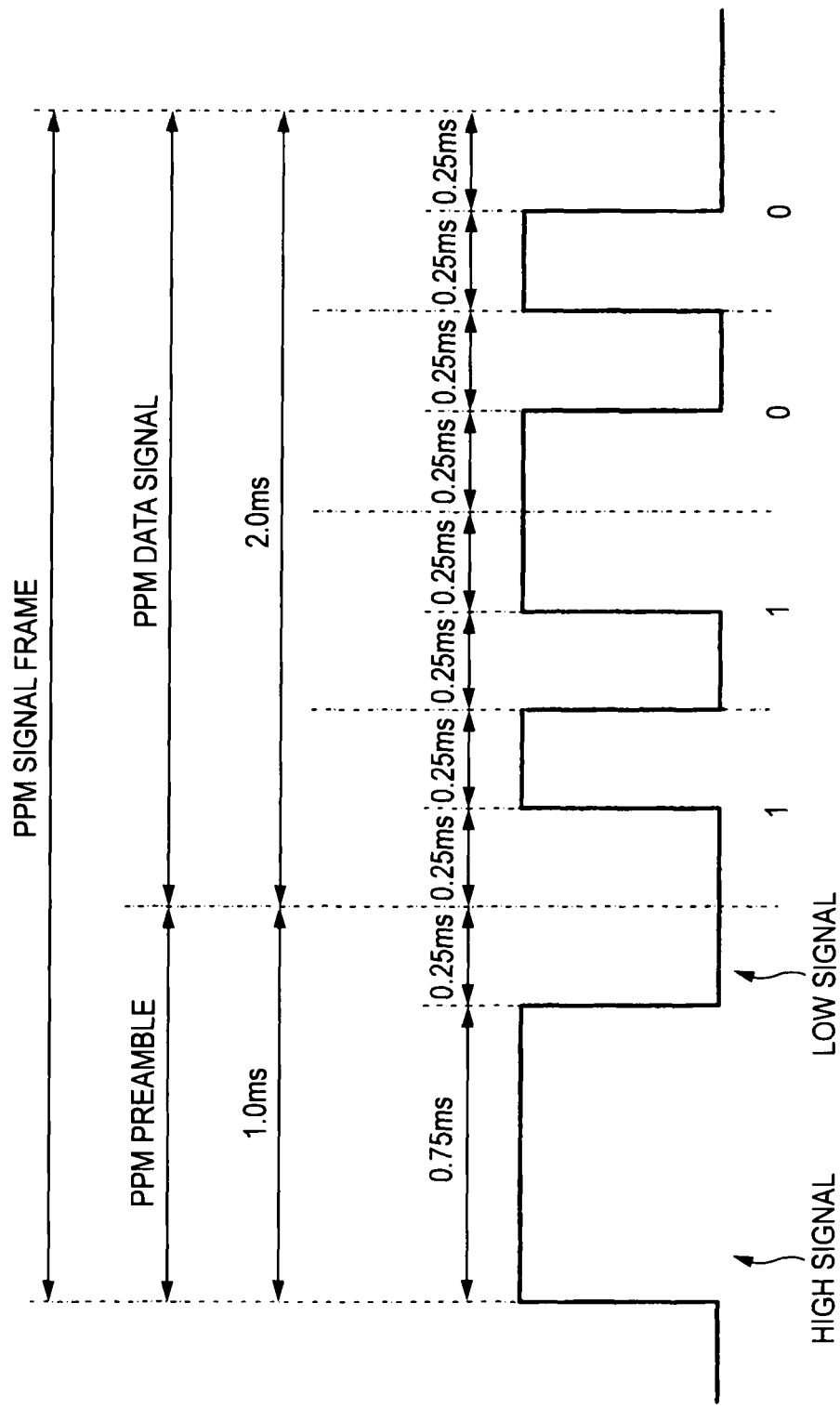

BINARY SIGNAL "0"

SYMBOL PERIOD

BINARY SIGNAL "1"

SYMBOL PERIOD

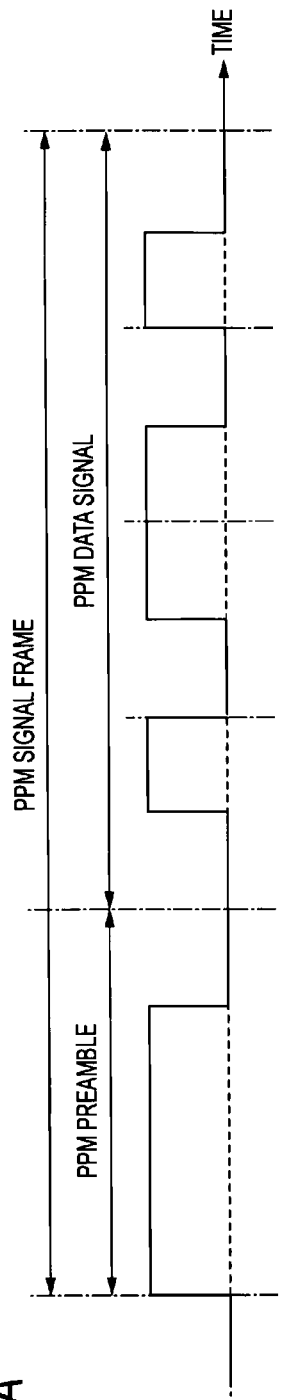
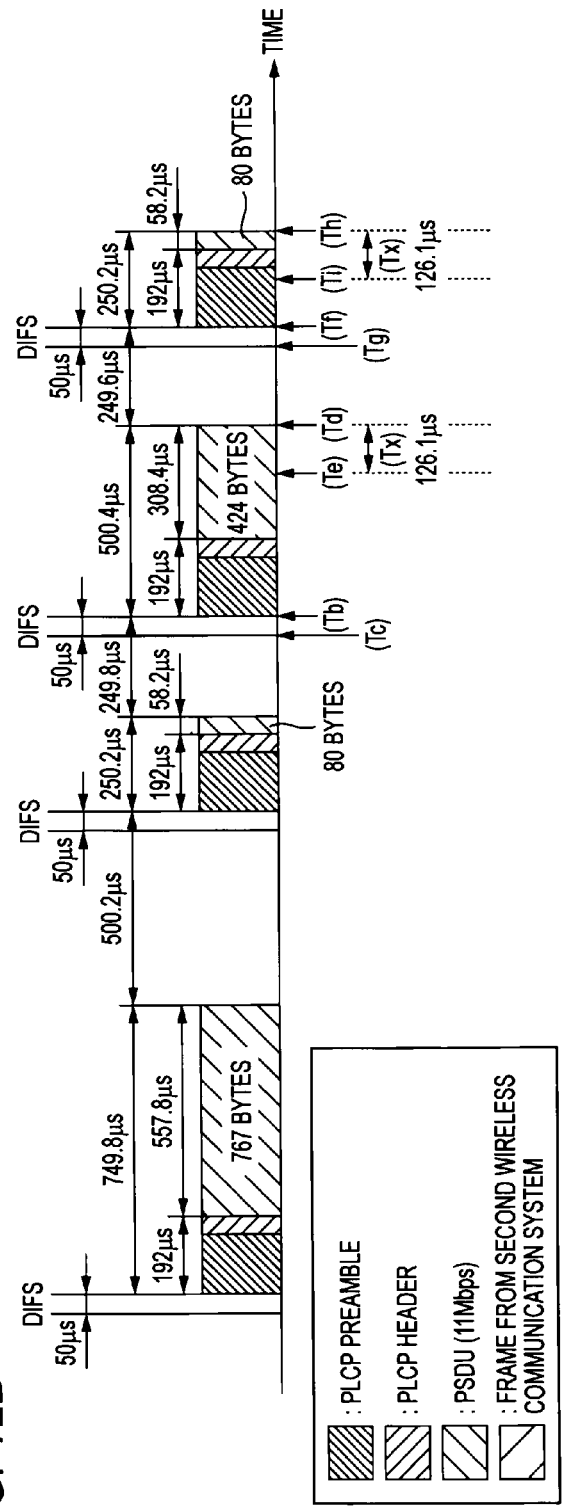
FIG. 12A
FIG. 12B

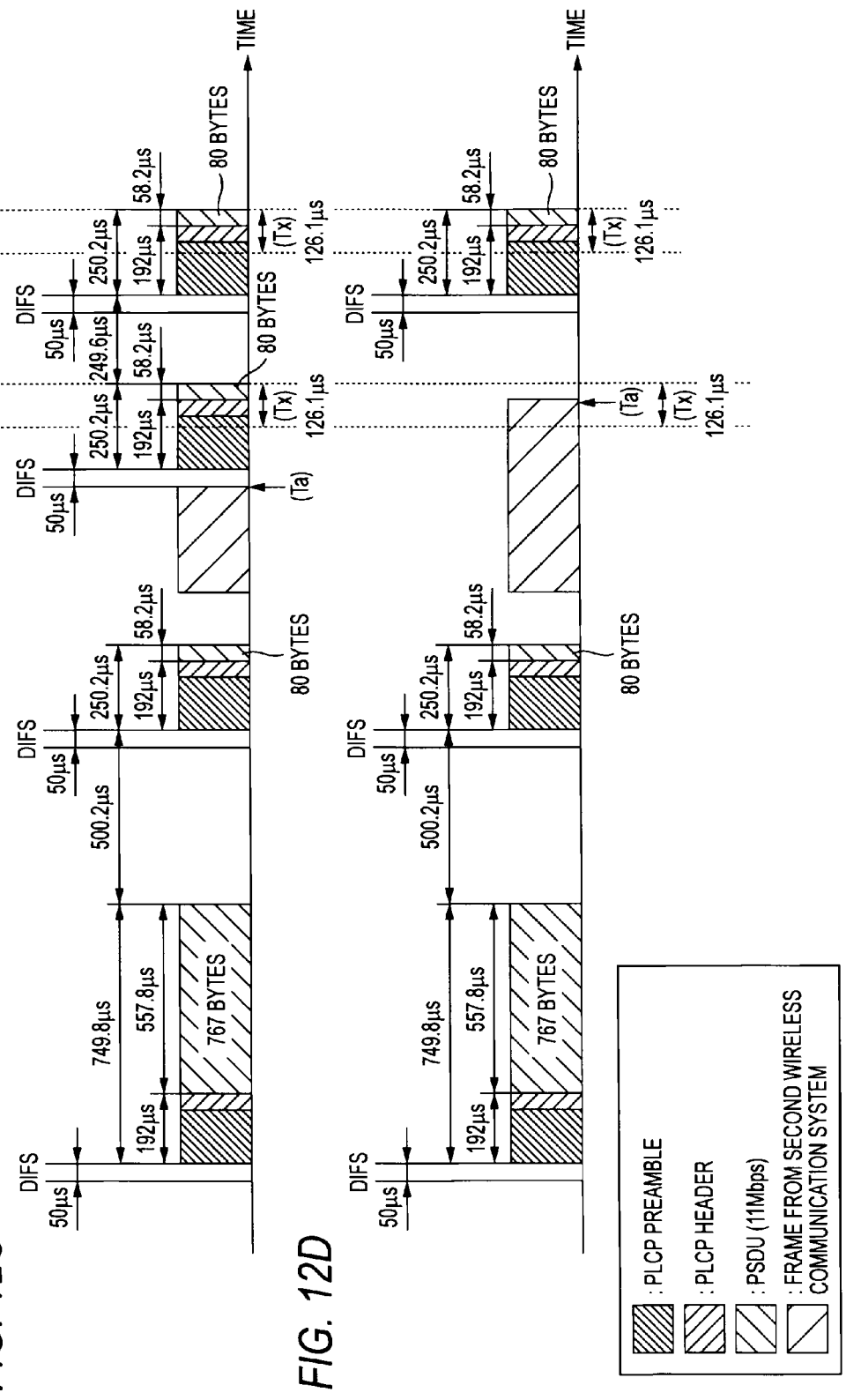

WIRELESS COMMUNICATION APPARATUS FOR SUPPRESSING INTERFERENCE WHILE REDUCING TRANSMISSION DELAY

This application is based upon and claims the benefit of priority from Japanese Patent Application No. 2009-041110, filed Feb. 24, 2009, the entire contents of which are incorporated herein by reference.

BACKGROUND

1. Field

The invention relates to a wireless communication apparatus.

2. Description of the Related Art

Recently, wireless LAN devices using a 2.4 GHz ISM (Industry-Science-Medical) band have been supplied. Using the same 2.4 GHz band, a wireless communication device that transmits and receives data by a weak radio wave, like a wireless tag or a wireless communication device that transmits and receives data by amplitude information as in ASK (Amplitude Shift Keying), is present. In these wireless communication devices (herein after, referred to as 2.4 GHz wireless communication devices) that transmit and receive data using the 2.4 GHz band, a transmission signal transmitted by a wireless LAN device becomes an interference signal. During the signal transmission of the wireless LAN device, the 2.4 GHz wireless communication device may not transmit and receive any signal.

To address this limitation, a method has been proposed in which the 2.4 GHz wireless communication device transmits a data signal after transmitting a NAV (Network Allocation Vector) frame signal before the data signal is transmitted (see JP-A-2008-153807). Since the wireless LAN device stops the signal transmission during a given time upon receipt of the NAV frame signal, the wireless LAN device does not become a source interfering with the 2.4 GHz wireless communication device.

SUMMARY OF THE INVENTION

However, in the method disclosed in JP-A-2008-153807, the start of data signal transmission may be delayed since the 2.4 GHz wireless communication device must transmit an NAV frame signal before a data signal is transmitted.

The invention provides a wireless communication apparatus for performing communication using a first communication scheme which transmits a signal using amplitude shift keying and a second communication scheme which suppresses communication with others except a communication counterpart by transmitting a transmission suppression signal before communication is started, the apparatus including: a first signal generation unit configured to generate transmission data; a modulation unit configured to generate first and second signals having different amplitudes by amplitude-shift keying the transmission data; a second signal generation unit configured to generate the transmission suppression signal having a signal length corresponding to that of the first signal; and a transmission unit configured to transmit the transmission suppression signal at the timing when the first signal is transmitted.

BRIEF DESCRIPTION OF THE SEVERAL VIEWS OF THE DRAWINGS

Embodiment may be described in detail with reference to the accompanying drawings, in which:

FIG. 3 is a diagram showing a PPM signal frame according to the first embodiment;

FIGS. 12A to 12E are diagrams illustrating a wireless LAN frame signal according to a fourth embodiment of the invention;

DETAILED DESCRIPTION

Hereinafter, embodiments of the present invention will be descried with reference to the drawings.

(First Embodiment)

Figure 1:
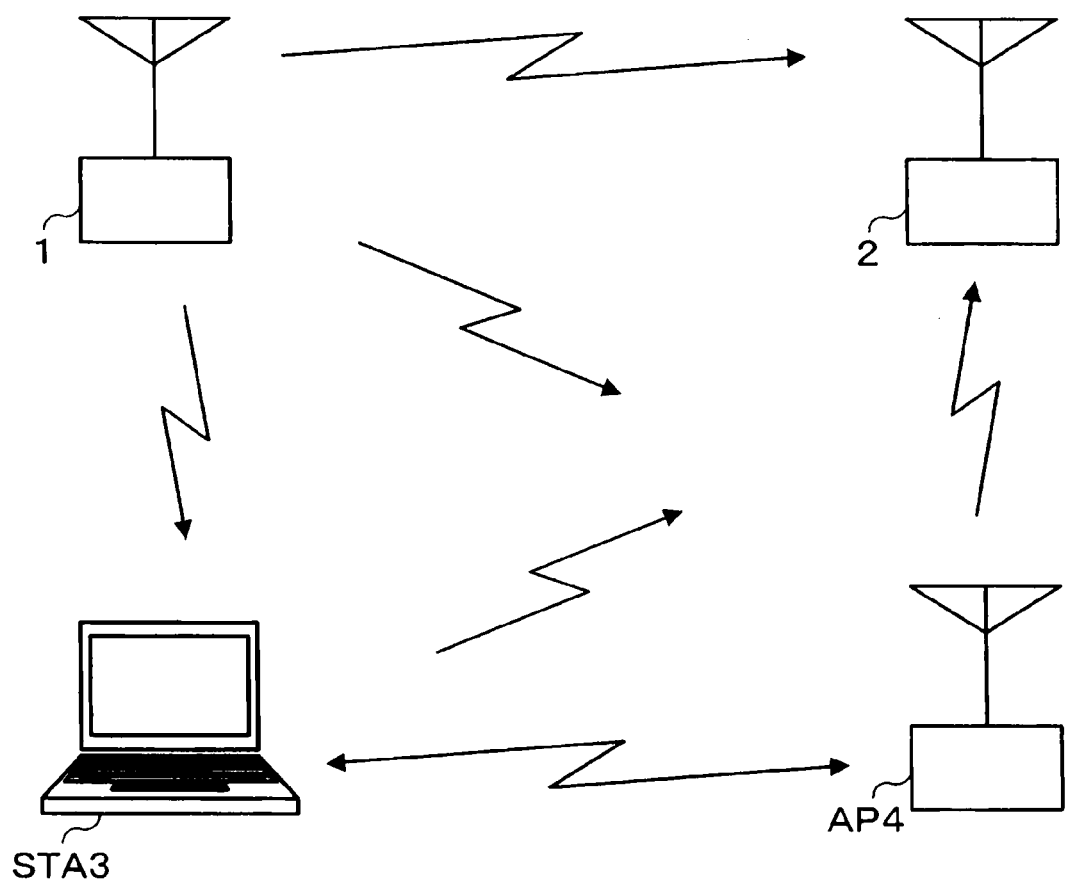
FIG. 1 is a schematic diagram of a wireless communication system according to a first embodiment of the invention.

FIG. 1 is a diagram schematically showing a wireless communication system according to the first embodiment. The wireless communication system according to this embodiment includes wireless communication devices 1 and 2. The wireless communication device 1 transmits a signal to the wireless communication device 2. As described later, the wireless communication device 1 uses a first communication scheme of transmitting a radio signal modulated by PPM (Pulse Position Modulation) to the wireless communication device 2 using a 2.4 GHz band.

In this embodiment, it is assumed that a second wireless communication system different from the wireless communication system may exist. The second wireless communication system is a system using a second communication scheme using the same 2.4 GHz band as in the wireless communication system, and is, for example, a wireless LAN system based on the IEEE 802.11b/g/n standard. The second wireless communication system has a wireless LAN terminal (STA) 3 and a wireless LAN base station (AP) 4, and performs local communication by transmitting a NAV frame signal to suppress communication with others except a communication counterpart.

All devices of the wireless communication device 2, the STA 3, and the AP 4 may receive a radio signal transmitted by the wireless communication device 1. All devices of the wireless communication devices 1 and 2, the STA 3, and the AP 4 may receive radio signals transmitted by the STA 3 and the AP 4.

When a radio signal is recognized before transmission since the STA 3 and the AP 4 based on the IEEE 802.11 standard adopt CSMA/CA as an access scheme, no transmission is performed until the radio signal is not recognized. However, when the STA 3 and the AP 4 have received PPM-modulated radio signals, transmission is not performed in a period when a High signal of the PPM-modulated radio signals is received, but there is a possibility that transmission will be started without recognizing a radio signal in a period when a Low signal is received.

Accordingly, for example, when the STA 3 transmits a radio signal while the wireless communication device 1 transmits a PPM-modulated radio signal, the radio signals interfere with each other, so that the wireless communication device 2 may not receive the radio signal transmitted by the wireless communication device 1.

This embodiment prevents the STA 3 and the AP 4 from transmitting a radio signal when the wireless communication device 1 transmits a radio signal by transmitting a NAV frame signal to the wireless communication device 2.

(Wireless Communication Device 1)

Figure 2:
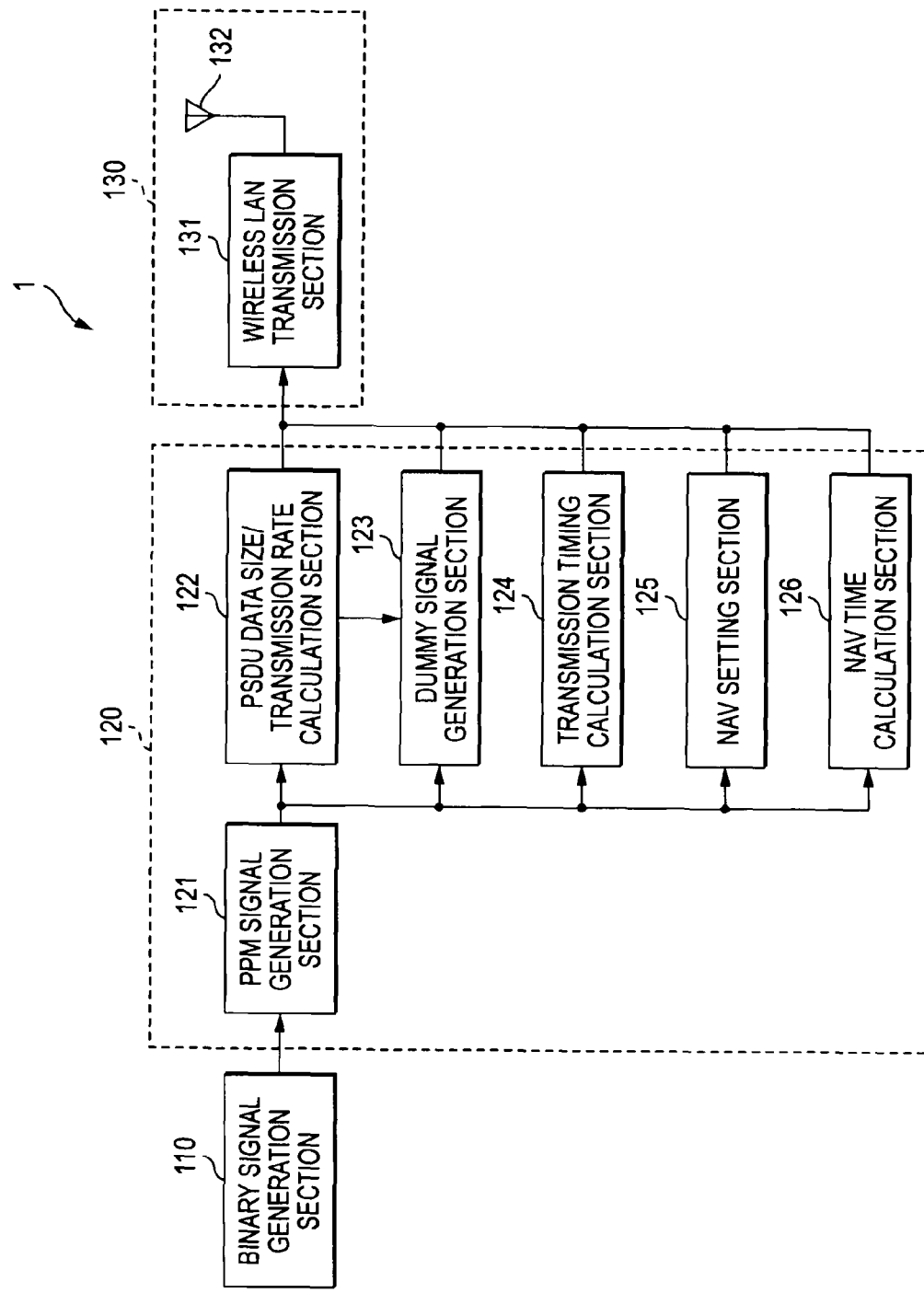
FIG. 2 is a block diagram showing a wireless communication device 1 according to the first embodiment.

Next, the wireless communication device 1 will be described using FIG. 2. The wireless communication device 1 performs communication using the first communication scheme and the second communication scheme described above.

The wireless communication device 1 includes a binary signal generation section 110, a control section 120 which generates a dummy signal on the basis of a binary signal generated by the binary signal generation section 110 and controls transmission of the dummy signal, and a transmission section 130 which converts the dummy signal into a wireless LAN frame and transmits the wireless LAN frame.

The control section 120 includes a PPM signal generation section 121, a PSDU data size/transmission rate calculation section 122, a dummy signal generation section 123, a transmission timing calculation section 124, a NAV setting section 125, and a NAV time calculation section 126.

The transmission section 130 includes a wireless LAN transmission section 131 and an antenna 132.

Next, each section will be described in detail.

The binary signal generation section 110 generates a binary signal including information to be reported to the wireless communication device 2. That is, the binary signal generation section 110 operates as first signal generation means for generating a binary signal as transmission data. The binary signal is a signal including a data string of "1" and "0". When a trigger signal is input from a higher layer (not shown), the binary signal generation section 110 may generate a binary signal by reading a signal stored in a storage section (not shown). The binary signal generation section 110 may generate a binary signal by converting information received from the higher layer (not shown) into a binary data string.

The control section 120 generates a dummy signal and notifies the transmission section 130 of control information for transmitting the generated dummy signal. The dummy signal is data of a frame body required for a wireless LAN frame main body excluding a MAC header and an FCS (Frame Check Sequence) from among PSDU data of a wireless LAN frame. The control information includes a PSDU data size, a transmission rate, the transmission timing, the presence/absence of NAV setting, and a NAV setting time. Details of the control section 120 are as follows.

The PPM signal generation section 121 generates a PPM signal frame by modulating a binary signal input from the binary signal generation section 110 and outputs the PPM signal frame to the PSDU data size/transmission rate calculation section 122, the transmission timing calculation section 124, the NAV setting section 125, and the NAV time calculation section 126. That is, the PPM signal generation section 121 generates a High signal as the first signal and a Low signal as the second signal by performing a process of modulating into a binary signal.

Figure 4A:
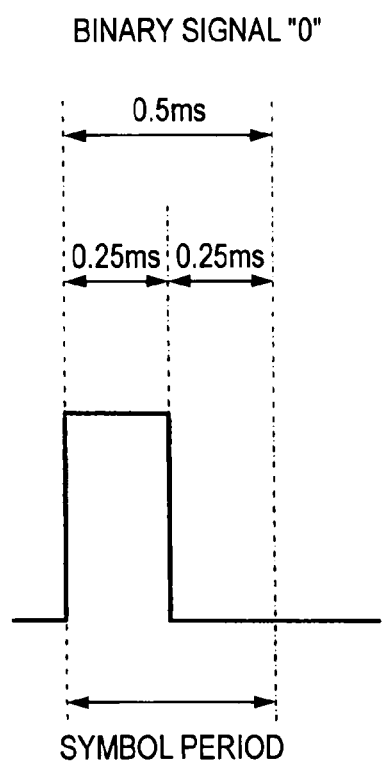
FIGS. 4A and 4B are diagrams illustrating an example of PPM-modulating a 1-bit binary signal according to the first embodiment.
Figure 4B:
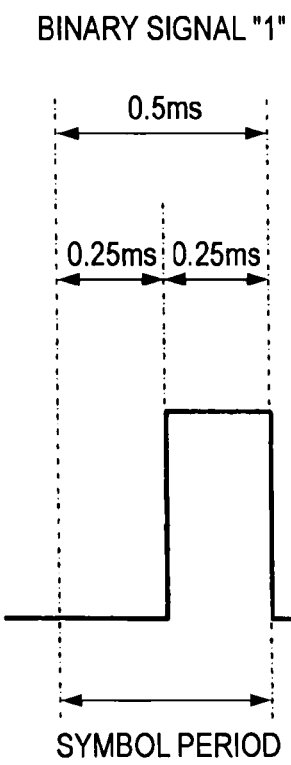

The PPM signal frame will be described using FIGS. 3 to 4B.

FIG. 3 is a diagram showing an example of the PPM signal frame. The PPM signal frame includes a PPM preamble indicating the beginning of the PPM signal frame and a PPM data signal in which a PPM-modulated binary signal is transmitted. The PPM signal frame includes a combination of High and Low signals.

FIG. 3 shows an example in which the length of one PPM signal frame is 3.0 ms. The PPM signal preamble is assigned 1.0 ms of the beginning of the one PPM signal frame. In this embodiment, the High signal exists in 0.75 ms of the beginning of the PPM preamble and the Low signal exists in 0.25 ms subsequent thereto. A PPM data signal subsequent to the PPM preamble is set to High and Low signals in response to a binary signal to be transmitted.

Here, a modulation method of PPM-modulating a binary signal will be described in detail using FIGS. 4A and 4B. FIGS. 4A and 4B show examples of modulating a 1-bit binary signal. In an example showing this embodiment, a unit of transmitting the 1-bit binary signal is called a 1-symbol period. The 1-bit binary signal is PPM-modulated by dividing the 1-symbol period into two of a first half and a second half and setting the High signal or the Low signal in one of the halves. In the examples of FIGS. 4A and 4B, the 1-symbol period is 0.5 ms.

FIG. 4A shows an example when a binary signal "0" is transmitted. When the binary signal "0" is PPM-modulated, the High signal is assigned to 0.25 ms of the first half of a 1-symbol period and the Low signal is assigned to 0.25 ms of the second half. FIG. 4B shows an example when a binary signal "1" is transmitted. When the binary signal "1" is PPM-modulated, the Low signal is assigned to 0.25 ms of the first half of the 1-symbol period and the High signal is assigned to 0.25 ms of the second half. As such, the High and Low signals are set for every 1 bit of the binary signal. The 1-bit binary signal is transmitted in the 1-symbol period.

In this embodiment, it is assumed that the PPM preamble length and the 1-symbol period are predefined by the system, and known by both the wireless communication devices 1 and 2. The length of a PPM signal frame is determined by the length of a PPM data signal. That is, the length of the PPM data signal and the length of the PPM signal frame are defined by the length of a signal string of binary signals.

The PPM data signal length may be known in advance by the system.

Returning to FIG. 2, the PSDU data size/transmission rate calculation section 122 calculates a PSDU data size and a transmission rate on the basis of a PPM signal frame input from the PPM signal generation section 121.

Figure 5:
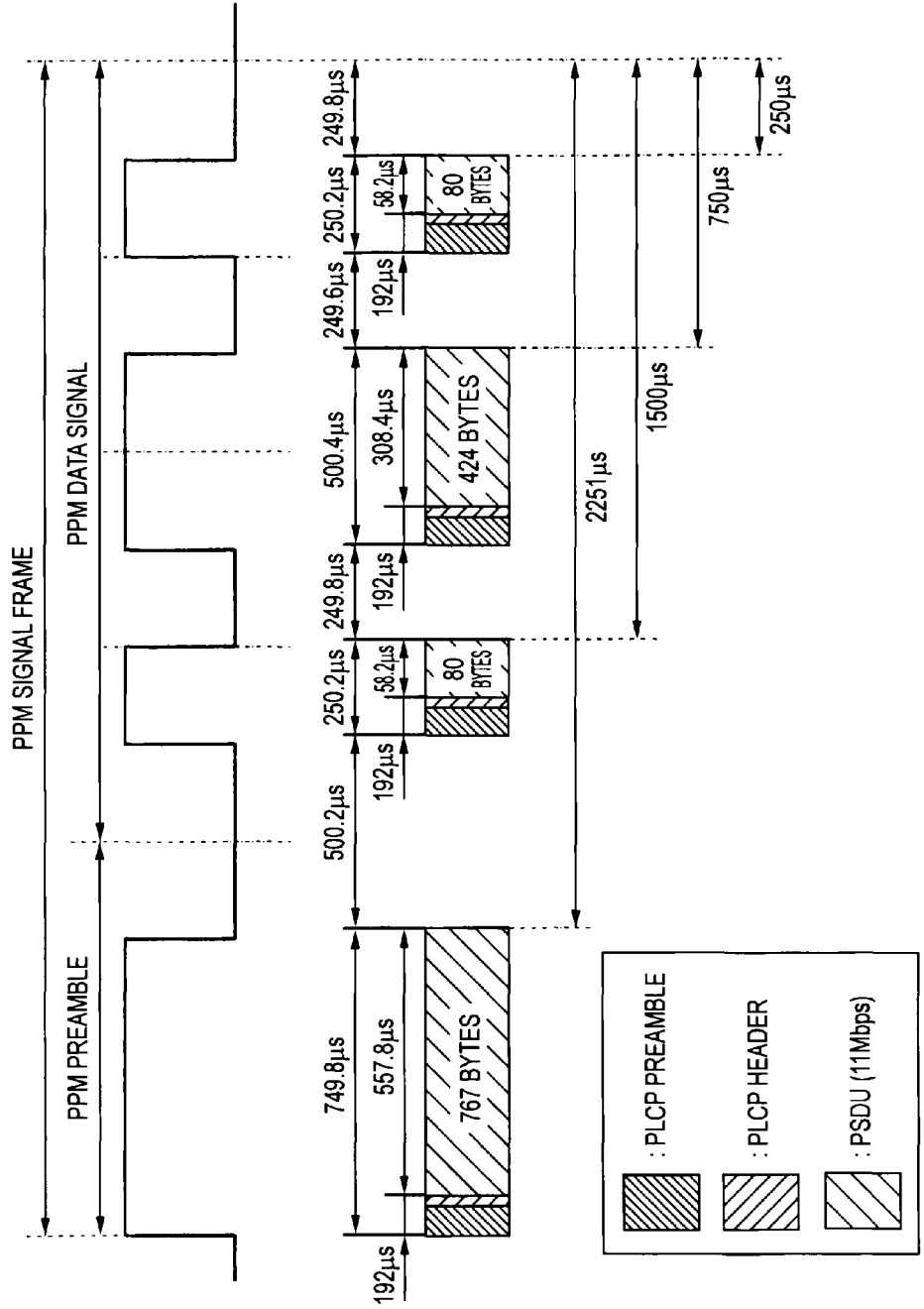
FIG. 5 is a diagram illustrating a wireless LAN frame signal according to the first embodiment.

The wireless communication device 1 transmits a wireless LAN frame signal capable of being received by the STA 3 and the AP 4 in a period corresponding to the length of the High signal of the PPM signal frame (see FIG. 5). The wireless communication device 1 does not transmit a signal in a period corresponding to the length of the Low signal of the PPM signal frame.

In the example of FIG. 3, the PSDU data size/transmission rate calculation section 122 calculates a PSDU data size and a transmission rate required to transmit wireless LAN frame signals having lengths of 0.75 ms, 0.25 ms, 0.5 ms, and 0.25 ms.

Details thereof will be described using FIG. 5. A wireless LAN frame signal includes a PLCP preamble, a PLCP header, and a PSDU. FIG. 5 shows a wireless LAN frame signal prescribed in IEEE 802.11b. In the wireless LAN frame signal of FIG. 5, a PLCP preamble of 144 μs and a PLCP header of 48 μs are transmitted before a PSDU.

The PSDU data size/transmission rate calculation section 122 calculates a PSDU data size and a transmission rate so that the wireless LAN frame signal length is set to a length corresponding to the High signal of the PPM signal frame by considering sizes of the PLCP preamble and the PLCP header. The PSDU data size/transmission rate calculator 122 adjusts two parameters of the PSDU data size and the transmission rate so that the length of the wireless LAN frame signal has a value closest to a time of the desired High signal.

The PSDU data size/transmission rate calculation section 122 outputs the calculated PSDU data size and transmission rate to the transmission section 130 and outputs the PSDU data size to the dummy signal generation section 123.

The dummy signal generation section 123 generates a dummy signal on the basis of the PSDU data size input from the PSDU data size/transmission rate calculator 122. The dummy signal generator 123 generates data of a frame body required for a wireless LAN frame main body excluding a MAC header and an FCS (Frame Check Sequence) on the basis of the PSDU data size. This data is called a dummy signal. The dummy signal may randomly be generated or may be generated sequentially by reading data, stored in a storage section (not shown) provided in the dummy signal generator 123, by a required length. The dummy signal generator 123 outputs the generated dummy signal to the transmission section 130. In this regard, when a transmission signal based on the IEEE 802.11 standard is generated, there is a possibility that a transmission signal having the same signal length as the High signal will be not generated. In this case, the dummy signal is generated so that the length of the transmission signal is close to that of the High signal. That is, the dummy signal is generated so that the length of the transmission signal (wireless LAN frame signal) corresponds to that of the High signal.

The transmission timing calculation section 124 calculates the transmission timing of a wireless LAN frame signal on the basis of a PPM signal frame input from the PPM signal generation section 121 and outputs the calculation result to the transmission section 130. For example, when the PPM signal frame shown in FIG. 3 has been input, the transmission timing calculation section reports it to the transmission section 130 so that the transmission section 130 starts first wireless LAN frame signal transmission and then starts wireless LAN frame signal transmissions after 1.25 ms, 1.75 ms, and 2.5 ms.

The NAV setting section 125 determines whether or not to set an NAV using a wireless LAN frame signal to be transmitted on the basis of the PPM signal frame input from the PPM signal generation section 121. When the end of the wireless LAN frame to be transmitted matches that of the PPM signal frame, the NAV is determined not to be set. Otherwise, the NAV is determined to be set. The NAV setting section 125 outputs the determination result to the transmission section 130.

Upon receipt of a notification that the NAV is set from the NAV setting section 125, the transmission section 130 sets the NAV by setting a specific bit to be included in a duration field of the MAC header according to the IEEE 802.11 standard.

The NAV time calculation section 126 calculates a NAV setting time on the basis of the PPM signal frame input from the PPM signal generation field 121 and outputs the calculated NAV setting time to the transmission section 130. The NAV setting time is a length of the remaining PPM signal frame when a wireless LAN frame signal transmitted by the transmission section 130 has been received. That is, the NAV setting time is a length from the end of the wireless LAN frame signal to be transmitted to the end of the PPM signal frame. The NAV time calculation section 126 calculates a period until a period corresponding to a data length of a binary signal as transmission data ends (the end of the PPM signal frame) after the transmission section 130 ends the transmission of a wireless LAN frame signal as the transmission signal (the end of the wireless LAN frame signal).

In the case of the PPM signal frame shown in FIG. 5, a NAV setting time corresponding to a first wireless LAN frame signal to be transmitted becomes 2.25 ms by subtracting 0.75 ms in which the wireless LAN frame signal is completely transmitted from 3.0 ms of the PPM signal frame length. In more detail, the NAV setting time is 2.2502 ms, not 2.25 ms, but becomes 2.251 ms by rounding up the number below μs order since the NAV setting time may be set only in a unit of μs. A NAV setting time corresponding to a second wireless LAN frame signal to be transmitted becomes 1.5 ms by subtracting 1.5 ms as a time in which the second wireless LAN frame signal is completely transmitted from 3.0 ms of the PPM signal frame length. An upper limit of the NAV setting time is defined by the IEEE 802.11 standard. When the NAV setting time calculated by the NAV time calculation section 126 exceeds the upper limit, the upper limit is output as the NAV setting time to the transmission section 130.

The transmission section 130 includes a wireless LAN transmission section 131 and an antenna 132. The wireless LAN transmission section 131 generates a wireless LAN frame signal to be transmitted on the basis of a PSDU data size and a transmission rate input from the PSDU data size/transmission rate calculation section 122, a dummy signal input from the dummy signal generation section 121, the transmission timing input from the transmission timing calculation section 124, the presence/absence of NAV setting input from the NAV setting section 125, and a NAV setting time input from the NAV time calculation section 126. That is, the transmission section 130 operates as second signal generation means for generating a wireless LAN frame signal having a signal length corresponding to that of the High signal as the first signal. This wireless LAN frame signal is a transmission suppression signal, which suppresses communication with others except a communication counterpart.

The wireless LAN transmission section 131 includes a MAC layer and a PHY layer, and generates a transmission signal by adding a MAC header or a PLOP preamble to a dummy signal input from the dummy signal generation section 123. Additionally, the wireless LAN transmission section 131 generates a radio signal by performing predetermined radio processes of D/A conversion, frequency conversion, and power amplification. The wireless LAN transmission section 131 transmits the radio signal via the antenna 132 at the transmission timing input from the transmission timing calculation section 124, that is, at the timing when the High signal as the first signal is transmitted.

Subsequently, the operation of the wireless communication device 1 will be described using FIG. 2.

When information for generating a trigger signal or a binary signal is input from the higher layer, the binary signal generation section 110 generates the binary signal.

The binary signal is input from the binary signal generation section 110 to the control section 120. On the basis of the binary signal, the control section 120 outputs information required for generating a radio signal, such as a PSDU data size, a transmission rate, or a dummy signal, to the transmission section 130. The control section 120 may output information for every wireless LAN frame signal to be transmitted to the transmission section 130. The control section 120 may output a plurality of information elements corresponding to a plurality of wireless LAN frames to the transmission section 130 along with a transmission sequence. That is, the information output by the control section 120 includes information of all wireless LAN frame signals to be transmitted and information regarding the transmission sequence.

The transmission section 130 generates and transmits a radio signal on the basis of the information input from the control section 120.

(Wireless Communication Device 2)

Figure 6:
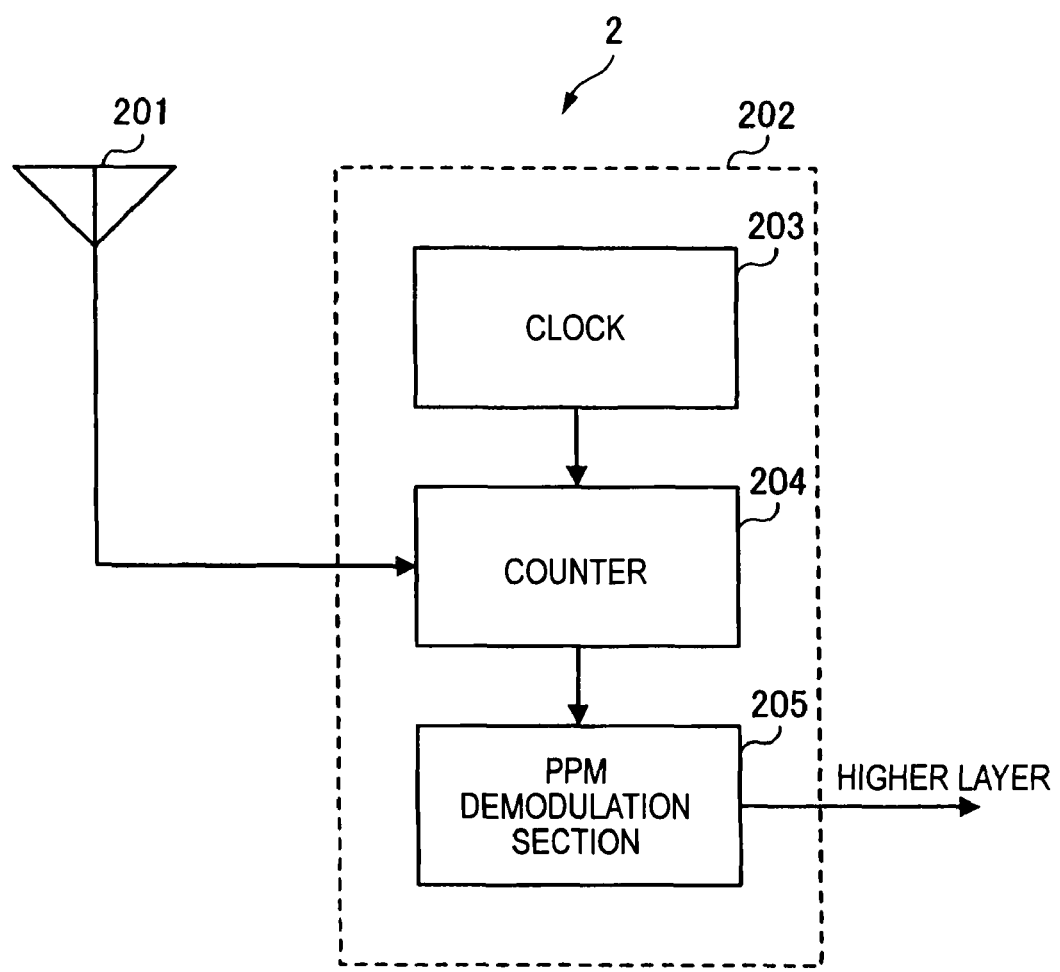
FIG. 6 is a diagram illustrating a wireless communication device according to the first embodiment.

The wireless communication device 2 will be described using FIG. 6.

The wireless communication device 2 has an antenna 201 and a reception section 202. The reception section 202 receives a radio signal via the antenna 201. The reception section 202 detects the length of the received radio signal. Specifically, the reception section 202 has a clock 203, a counter 204, and a PPM demodulation section 205, and detects the signal length by counting the number of clocks by the counter 204 while the radio signal is received, that is, while the received signal is in the High state. Likewise, while no radio signal is received, that is, while the received signal is in the Low state, the counter 204 counts the number of clocks. The counter 204 outputs a count value to the PPM demodulation section 205.

The PPM demodulation section 205 demodulates the radio signal into a binary signal from the length of the High state and the length of the Low state input from the counter 204. Since a 1-symbol period is known in advance, the PPM demodulation section 205 demodulates the radio signal into the binary signal by detecting whether a signal of the first and second halves in the 1-symbol period is in the High or Low state. The demodulated binary signal is output to the higher layer (not shown).

(STA 3 and AP 4)

The STA 3 and the AP 4 are wireless communication devices, which transmit and receive a radio signal on the basis of the IEEE 802.11 standard. When a radio signal transmitted from the wireless communication device 1 is received, the STA 3 and the AP 4 perform radio signal processes such as A/D conversion and demodulation and analyze a wireless LAN frame signal. When a specific bit contained in a duration field of a MAC header of the analyzed wireless LAN frame signal has been set, the STA 3 and the AP 4 suppress radio signal transmission only during a NAV setting time contained in the duration field of the MAC header.

When the wireless communication device 1 transmits a wireless LAN frame signal and sets a NAV using the wireless LAN frame signal as described above, the wireless communication system according to this embodiment may suppress signal transmission of the STA 3 and the AP 4 provided in the second wireless communication system while the wireless communication device 1 transmits a signal. A transmission start of a desired signal to be transmitted is not delayed by setting the NAV using a desired radio signal itself to be transmitted, without transmitting the desired radio signal after the wireless communication device 1 sets the NAV.

To transmit a wireless LAN frame signal in a period corresponding to the High signal of a desired PPM signal frame to be transmitted, the NAV may be set multiple times, thereby improving the precision of NAV setting. Since the NAV may be set multiple times even when a length of the desired PPM signal frame to be transmitted exceeds an upper limit of the NAV setting time, the transmission of the STA 3 and the AP 4 may be suppressed until the PPM signal frame is completely transmitted.

In the above-described embodiment, the case where the wireless communication device 1 performs PPM modulation, that is, the case where binary amplitude shift keying is performed, has been described, but n-ary amplitude shift keying (2<n) may be performed. In this case, for example, a transmission suppression signal having a signal length corresponding to a $k^{th}$ High signal having a $k^{th}$ largest amplitude value (2<k≦n) is generated and transmitted. Alternatively, a transmission suppression signal having a signal length corresponding to the High signal having a different amplitude value may be generated.

(Second Embodiment)

A wireless communication system according to a second embodiment of the present invention will be described. In this embodiment, a NAV may be set in all frequency bands used in the wireless LAN system by respectively transmitting a plurality of wireless LAN frame signals in different frequency bands.

Since the wireless communication system according to this embodiment is the same as that of the first embodiment, except that a control section 120 of a wireless communication device 5 has a frequency control section 127, the same reference numerals are used and description thereof is omitted.

Figure 7:
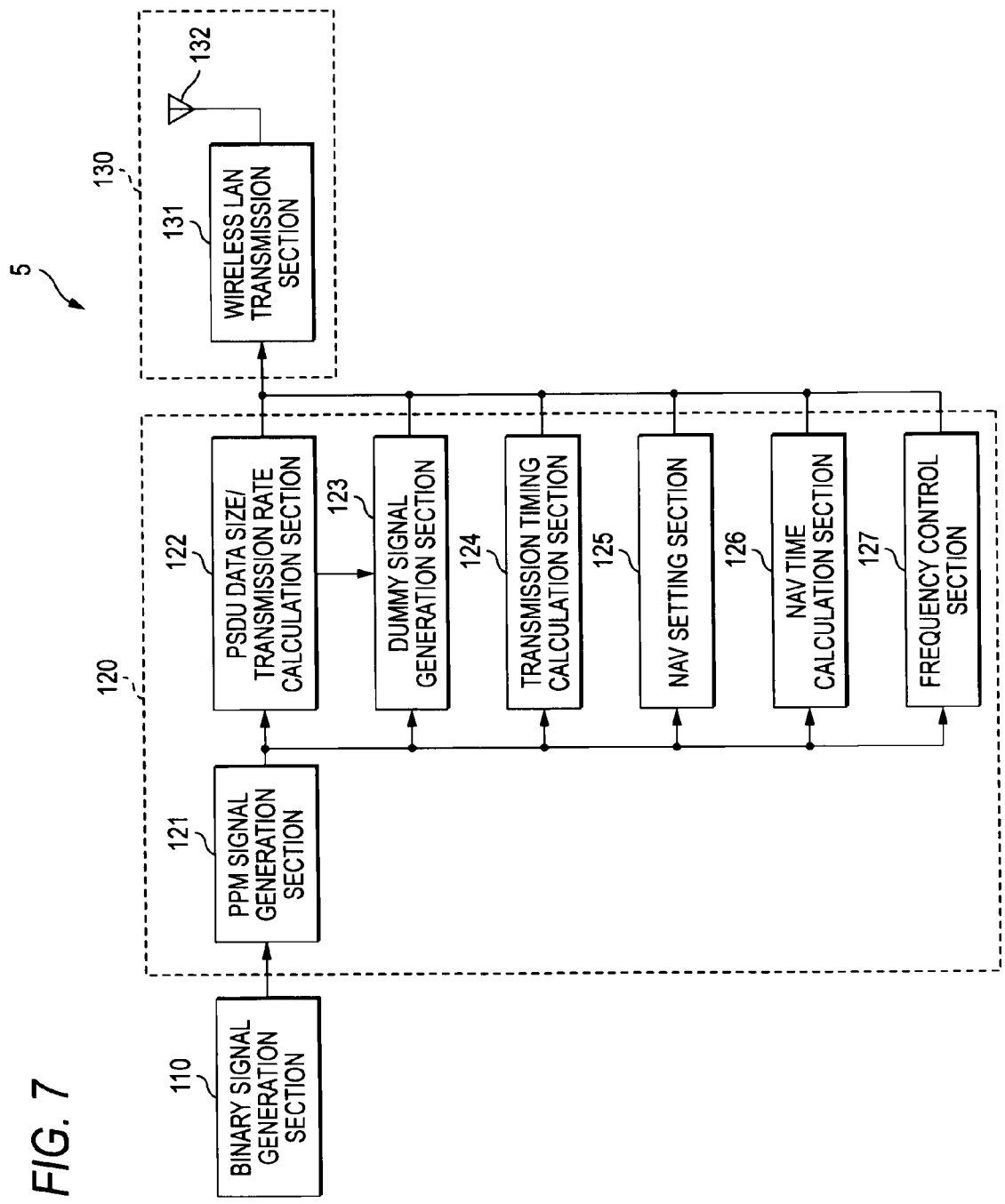
FIG. 7 is a diagram illustrating a wireless communication device according to a second embodiment of the invention.

FIG. 7 shows a block diagram of the wireless communication device 5 according to this embodiment. The wireless communication device 5 is the same as the wireless communication device 1 shown in FIG. 1, except that the control section 120 has the frequency control section 127.

When a PPM signal frame is input from the PPM signal generation section 121, the frequency control section 127 detects the High signal from the PPM signal frame and determines a frequency (transmission frequency) at which a wireless LAN frame signal is transmitted in a period of the High signal.

Figure 8:
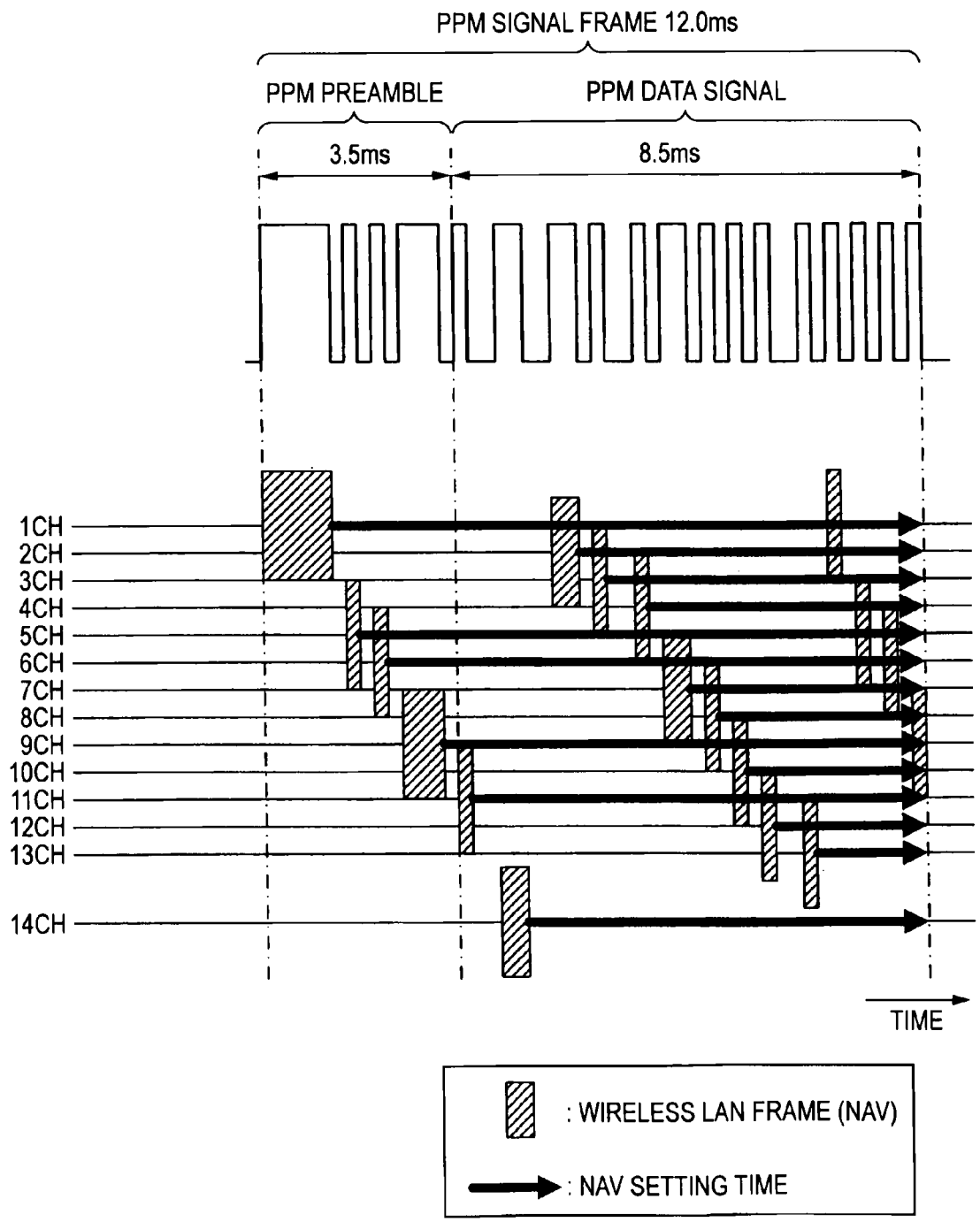
FIG. 8 is a diagram illustrating a wireless LAN frame signal according to the second embodiment.

FIG. 8 shows a relationship between the transmission frequency determined by the frequency control section 127 and the wireless LAN frame signal. In the wireless LAN system based on the IEEE 802.11b/g standard using a 2.4 GHz band, a given frequency band used for transmission is arranged as 1 ch to 14 ch in ascending order of frequencies. The frequency control section 127 determines a frequency channel on which a wireless LAN frame signal is transmitted. In the example of FIG. 8, the frequency control section 127 determines to transmit a first wireless LAN frame signal on 1 ch. The frequency control section 127 determines to transmit a second wireless LAN frame signal on 5 ch.

A frequency channel to be transmitted may be determined at random or in descending order of use frequencies. Alternatively, the frequency control section 127 has a storage section (not shown) and may determine a frequency using a sequence number of channel information stored in the storage section. In consideration of efficiently using 1 ch to 14 ch without overlapping with a proximity channel, the use of four channels of 1 ch, 5 ch, 9 ch, and 14 ch or three channels of 1 ch, 6 ch, and 11 ch is an example of efficient frequency use. The storage section stores 1 ch, 5 ch, 6 ch, 9 ch, 11 ch, and 14 ch in this order, and stores the remaining 2 ch, 3 ch, 4 ch, 7 ch, 8 ch, 10 ch, 12 ch, and 13 ch in this order. The storage section may store 1 ch, 5 ch, 9 ch, and 14 ch in this order, and the frequency control section 127 may periodically determine the four channels in order.

The frequency control section 127 outputs the determined frequency channel to the transmission section 130. The frequency control section 127 may output a frequency channel whenever a wireless LAN frame signal is transmitted and may output a frequency channel along with every PPM signal frame. When the frequency channel is output every PPM signal frame, the frequency channel mapped to a sequence number for transmission is output.

The transmission section 130 generates a wireless LAN frame signal on the basis of information input from the control section 120 and generates a radio signal by performing a radio process for the wireless LAN frame signal. The transmission section 130 transmits the generated radio signal on the frequency channel determined by the frequency control section 127.

The wireless communication device 2 receives signals of all frequency bands used in the wireless LAN system. That is, the wireless communication device 2 receives all radio signals transmitted by the wireless communication device 5. Since the operation of the wireless communication device 2 after reception is the same as that of the wireless communication device 2 according to the first embodiment, description thereof is omitted.

The STA 3 and the AP 4 perform communication by selecting one frequency channel in a frequency band used in the wireless LAN system. Since the wireless communication device 5 sets a NAV by transmitting wireless LAN frame signals on a plurality of frequency channels, the STA 3 and the AP 4 receive one of the wireless LAN frame signals transmitted by the wireless communication device 5. The STA 3 and the AP 4 do not transmit a signal during a NAV setting time included in the received wireless LAN frame signal.

As described above, the wireless communication system according to the second embodiment achieves the same effect as that of the first embodiment, and changes a frequency channel to be transmitted for every wireless LAN frame signal, so that a NAV may be set independent of a frequency channel used for communication by the STA 3 and the AP 4.

(Third Embodiment)

A wireless communication system according to a third embodiment of the present invention will be described. A wireless communication device 6 according to this embodiment provides detection means for detecting whether or not a radio signal has been received in a given period before a wireless LAN frame signal is transmitted, and transmits a wireless LAN frame signal when no signal has been received in the given period. Thereby, the wireless communication device 6 may reduce the influence on a second wireless communication system.

Since the wireless communication system according to this embodiment has the same configuration as that shown in FIG. 1, except that the wireless communication device 6, which transmits a wireless LAN frame signal, has a wireless LAN reception section 140 and a transmission/reception changeover switch 150, the same reference numerals are used and description thereof is omitted.

Figure 9:
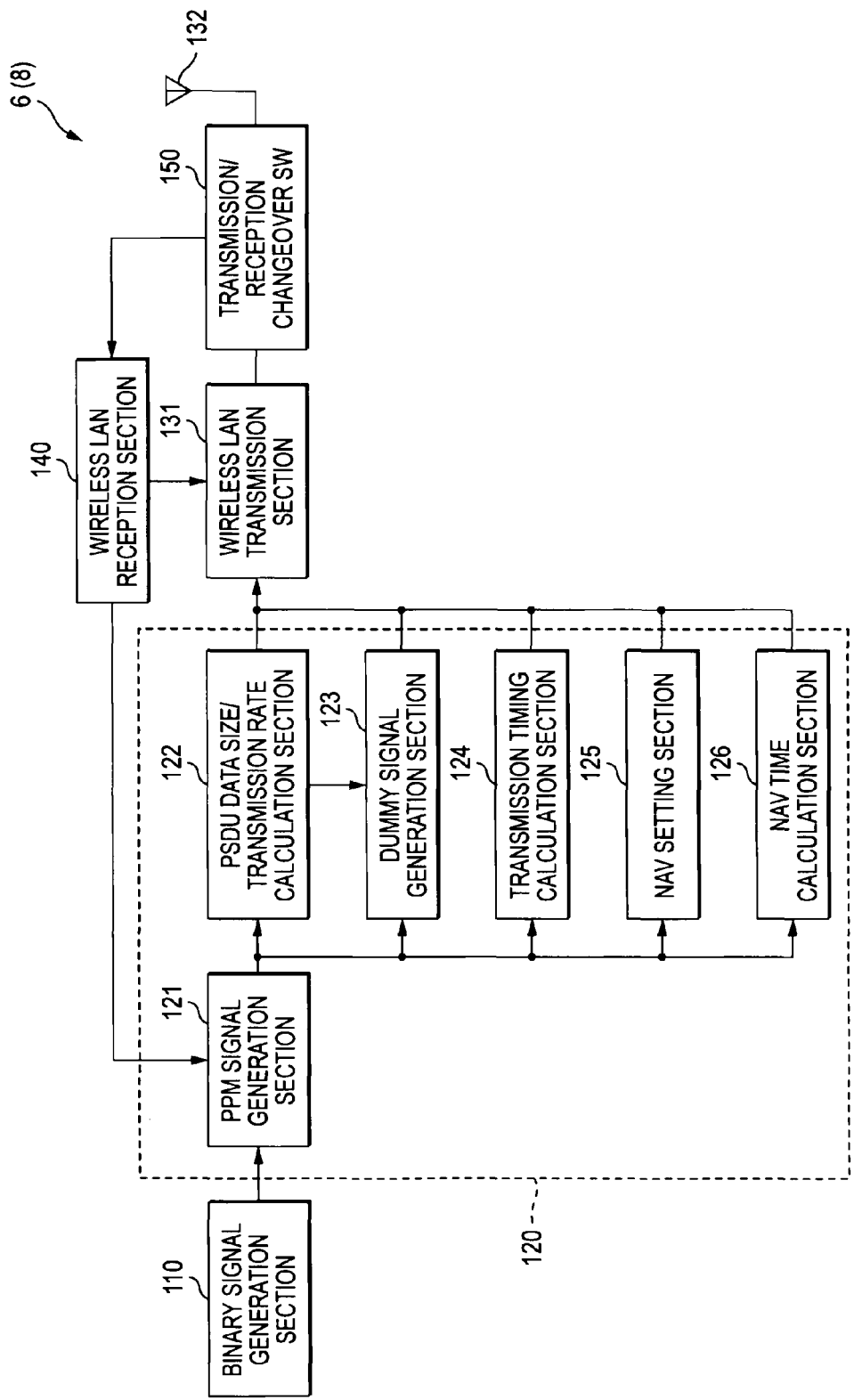
FIG. 9 is a diagram illustrating a wireless communication device according to a third embodiment of the invention.

FIG. 9 shows a block diagram of the wireless communication device 6 according to this embodiment. The wireless communication device 6 has the same configuration as the wireless communication device 1, except that the wireless communication device has the wireless LAN reception section 140 and the transmission/reception changeover switch 150. In this embodiment, the antenna 132 is commonly used even in reception, but a receive antenna may separately be installed.

Figure 10:
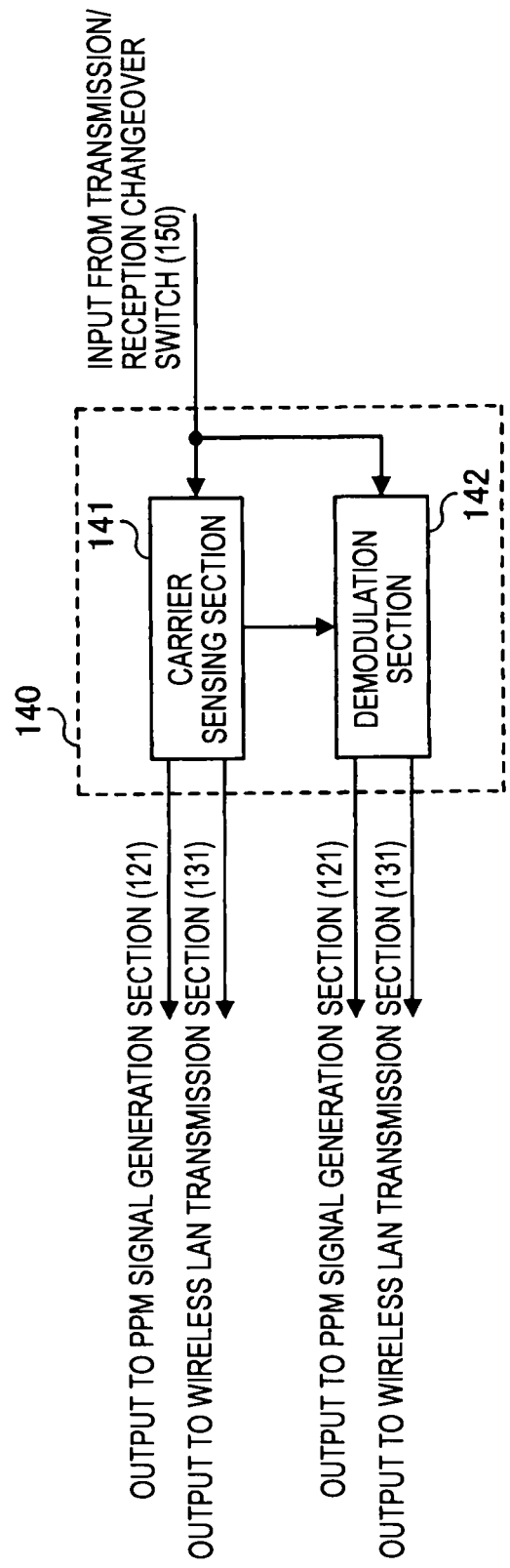
FIG. 10 is a diagram illustrating a wireless LAN reception section according to the third embodiment.

FIG. 10 shows a block diagram of the wireless LAN reception section 140 according to this embodiment.

The wireless LAN reception section 140 includes a carrier sensing section 141 which determines whether received power is equal to or greater than a threshold by measuring the received power of a radio signal input from the transmission/reception changeover switch 150, and a demodulation section 142 which demodulates the radio signal input from the transmission/reception changeover switch 150 when it is determined that the received power is equal to or greater than the threshold.

The carrier sensing section 141 outputs the carrier sensing result, as the result of determining whether or not the received power is equal to or greater than the threshold, to the PPM signal generation section 121 and the wireless LAN transmission section 131. The demodulation section 142 outputs the demodulation result to the PPM signal generation section 121 and the wireless LAN transmission section 131.

On the basis of control information input from the wireless LAN transmission section 131, the transmission/reception changeover switch 150 outputs a received radio signal to the wireless LAN reception section 141 via the antenna 132, transmits a radio signal input from the wireless LAN transmission section 131 via the antenna 132, or switches the transmission/reception of the radio signal. Specifically, the control information includes a transmission period in which the wireless LAN transmission section 131 transmits a radio signal. The transmission/reception changeover switch 150 transmits a radio signal via the antenna 132 by switching the switch to a transmitting side during the transmission period included in the control information. During a period other than the transmission period, a radio signal received via the antenna 132 is output to the wireless LAN reception section 140 by switching the switch to a receiving side.

Next, the operation of the wireless communication device 6 according to this embodiment will be described.

The carrier sensing section 141 of the wireless communication device 6 performs a carrier sensing process while a radio signal is input from the transmission/reception changeover switch 150. Specifically, the power of the radio signal is measured and the measured power is compared with a threshold Th. When the power is equal to or greater than the threshold as the comparison result, the comparison result is output to the demodulation section 142, the wireless LAN transmission section 131, and the PPM signal generation section 121 immediately after the comparison.

Upon receipt of a notification indicating that the power is equal to or greater than the threshold from the carrier sensing section 141, the demodulation section 142 performs a demodulation process for the radio signal input from the transmission/reception changeover switch 150. The demodulation result is output to the wireless LAN transmission section 131 and the PPM signal generation section 121 immediately after the demodulation process.

On the other hand, when the transmission timing is input from the transmission timing calculation section 124, the wireless LAN transmission section 131 checks the carrier sensing result of a previous time corresponding to a DIFS (Distributed Inter-Frame Space) period from the input timing. Specifically, during the DIFS period, it is determined whether or not the notification indicating that the power is equal to or greater than the threshold has been received from the carrier sensing section 141.

When it is determined that the notification has not been received, the wireless LAN transmission section 131 transmits a radio signal by outputting control information to the transmission/reception changeover switch 150. The control information includes a period in which the wireless LAN transmission/reception section 131 transmits the radio signal.

On the other hand, when it is determined that the notification has been received, the wireless LAN transmission section 131 stops the transmission of a radio signal during a given period.

Upon receipt of the notification indicating that the power is equal to or greater than the threshold from the carrier sensing section 141, the PPM signal generation section 121 stops the PPM signal generation during a given period. When a PPM signal has been generated, the generated PPM is not output to a processing section of a subsequent stage during the given period.

Upon receipt of the notification indicating that the power is equal to or greater than the threshold from the carrier sensing section 141, the control section 120 may prevent a process from being performed during the given period. In addition to the above description, the notification of the carrier sensing section 141 may directly be input to each section of the control section 120, and a processing section of a front stage may instruct a processing section of a subsequent stage to stop processing.

As such, the wireless communication system according to the third embodiment achieves the same effect as that of the first embodiment and performs carrier sensing before a radio signal is transmitted, thereby preventing the interference to a communication of the second wireless communication system.

(Modified Example)

Figure 11:
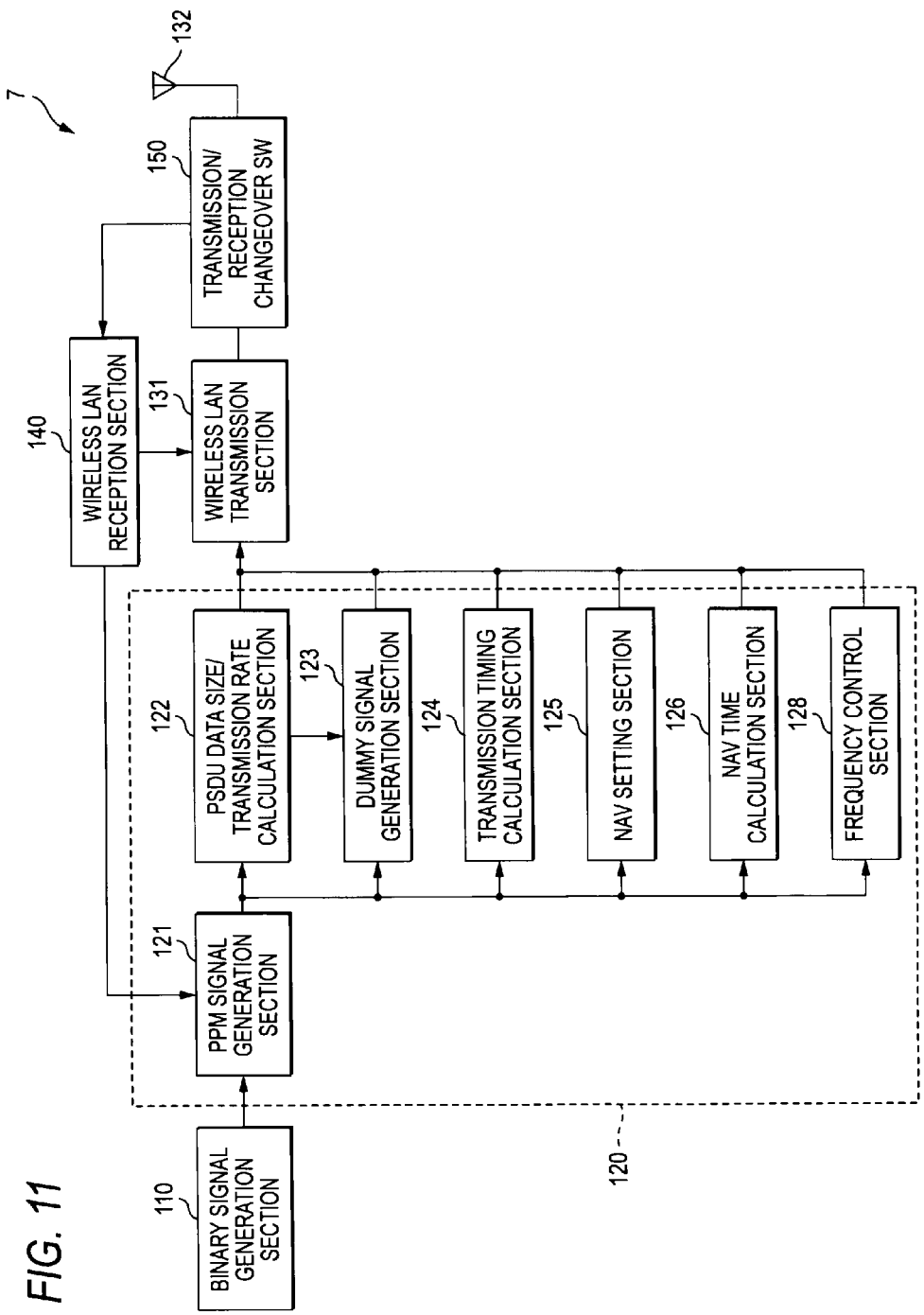
FIG. 11 is a diagram illustrating a modified example of the third embodiment.

Next, a modified example of the third embodiment will be described using FIG. 11. In a wireless communication device 7 of this modified example, a control section 120 has a frequency control section 128. In this modified example, when the carrier sensing section 141 operating as detection means has received a signal in a given period, a wireless LAN frame signal is transmitted using a frequency band different from that of the received signal. That is, on the basis of the carrier sensing result, the wireless LAN transmission section 131 transmits a radio signal using a different frequency channel instead of stopping radio signal transmission.

The demodulation section 142 of the wireless LAN reception section 140 performs a demodulation process, detects a wireless LAN frame length included in a PLCP header of a wireless LAN frame as the result of demodulating a radio signal, and outputs the frame length to the PPM signal generation section 121. When a generated PPM signal has been transmitted, the PPM signal generation section 121 determines whether or not the High signal overlaps with the wireless LAN frame from the frame length. In the case of overlap, the frequency control section 128 is controlled so that transmission is performed at a frequency different from a current frequency.

On the basis of control from the PPM signal generation section 121, the frequency control section 128 determines a frequency channel different from that used for current transmission, and outputs the determined frequency channel to the wireless LAN transmission section 131.

The wireless LAN transmission section 131 transmits a radio signal using the frequency channel input from the frequency control section 128.

Thereby, even when the second wireless communication system performs communication, a radio signal may be transmitted without interfering with the communication.

(Fourth Embodiment)

A wireless communication system according to a fourth embodiment of the present invention will be described. A wireless communication device 8 according to this embodiment sets a signal length so that a sum of the length of a signal transmitted by the STA 3 or the AP 4 of the second wireless communication system and the length of a signal transmitted by the wireless communication device 8 is the same as a desired signal length, that is, a period of the High signal of a PPM signal frame. Specifically, the transmission section 130 operating as second signal generation means generates a wireless LAN frame signal on the basis of the end timing of a radio signal received by the wireless LAN reception section 140. The wireless communication device 2 detects only the presence/absence of a signal regardless of any one of the wireless communication device 8, the STA 3, and the AP 4 as a transmission source. Accordingly, even when the STA 3/the AP 4 performs communication, the wireless communication device 8 may transmit a signal to the wireless communication device 2 by using a signal transmitted by the STA 3/the AP 4.

Since the wireless communication system according to this embodiment has the same configuration and operation as that shown in FIG. 9, except that the length of the High signal of a PPM signal generated by the PPM signal generation section 121 differs according to the carrier sensing result, the same reference numerals are used and description thereof is omitted.

Upon receipt of the notification indicating that the power is equal to or greater than the threshold from the carrier sensing section 141, the demodulation section 142 performs a demodulation process for a radio signal input from the transmission/reception changeover switch 150. At this time, the demodulation section 142 calculates the length of a wireless LAN signal as a radio signal transmitted by the STA 3 or the AP 4 on the basis of the received signal for which the demodulation process has been performed. That is, the demodulation section 142 calculates the timing of an end of data to be subsequently transmitted by analyzing a header arranged at the beginning of the wireless LAN signal. Since this is the same as a process of calculating the timing when all radio signals transmitted by the STA 3 and the AP 4 are completely received, the timing calculated by the demodulation section 142 is referred to as the reception completion timing Ta. The demodulation section 142 outputs the calculated reception completion timing to the PPM signal generation section 121.

The PPM signal generation section 121 compares the reception completion timing Ta input from the demodulation section 142 with the timing (herein after, referred to as the timing Tc before the DIFS for the transmission start of the High signal) that is earlier than the timing (herein after, referred to as the transmission start timing Tb of the High signal) of the beginning of the High signal of the PPM signal by the DIFS.

(a) A case where the reception completion timing Ta is earlier than the timing Tc before the DIFS for the transmission start of the High signal:

In this case, the PPM signal generation section 121 does not perform any operation. That is, the wireless communication device 8 transmits a wireless LAN frame signal corresponding to the length of the High signal according to a PPM signal generated by the PPM signal generation section 121.

(b) A case where the reception completion timing Ta is later than the timing Tc before the DIFS for the transmission start of the High signal (a case where the end timing of the radio signal is earlier than the transmission end timing of the High signal as the first signal by a certain time that is longer than the first interval):

In this case, the following process is performed according to a relationship between the timing of an end of the High signal of the PPM signal (herein after, referred to as the transmission completion timing Td of the High signal) and the reception completion timing Ta. The transmission completion timing Td corresponds to the transmission end timing of the wireless LAN frame signal.

Figure 12E:
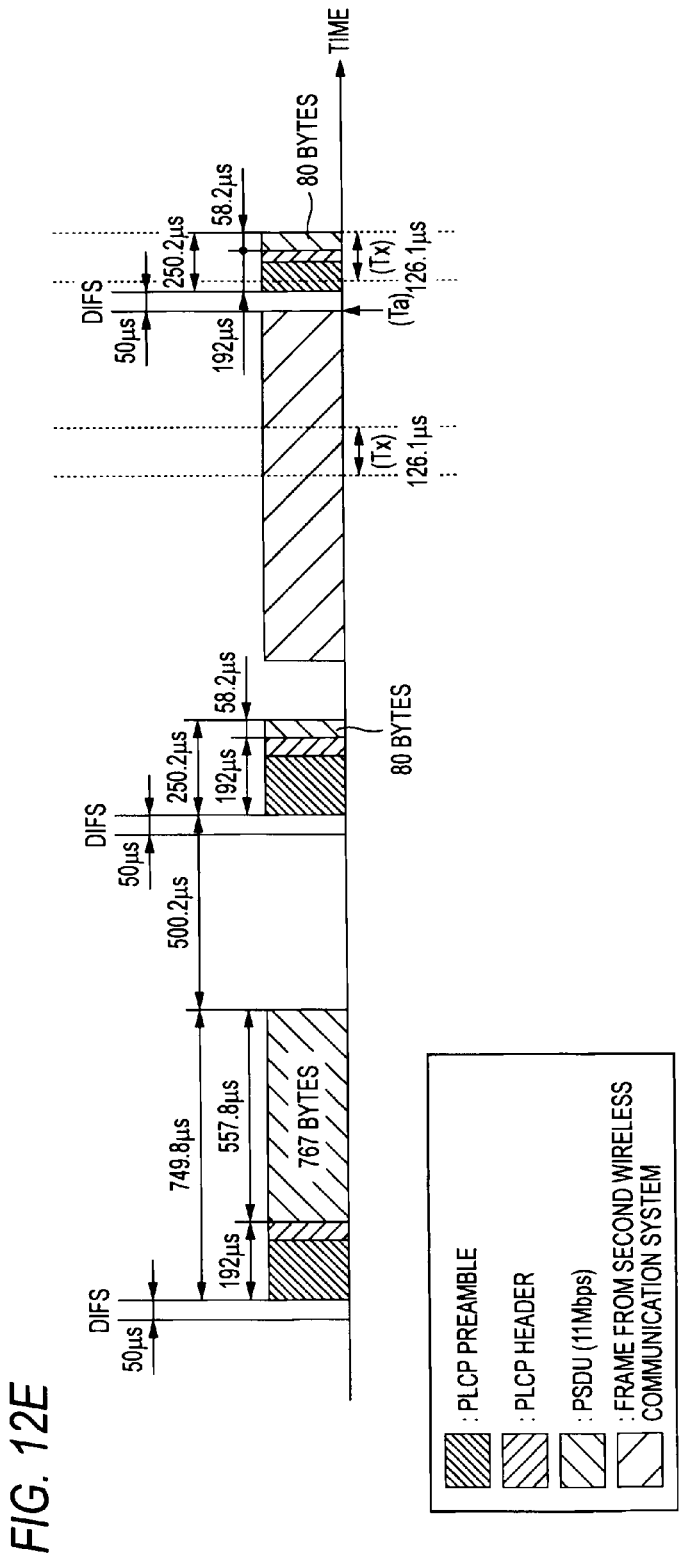

(b-1) A case where the transmission completion timing Td and the reception completion timing Ta satisfy a condition of (Td>Ta) and an interval between Td and Ta is greater than a give period Tx (Td−Ta>Tx) (see FIG. 12C):

As shown in FIG. 12C, when Td−Ta>Tx, the PPM signal generation section 121 generates the High signal in a period from the timing, when a DI FS time has elapsed from the reception completion timing Ta, to the transmission completion timing Td. That is, the PPM signal generation section 121 notifies the transmission timing calculation section 124 of the timing, when the DIFS time has elapsed from the reception completion timing Ta, as the transmission timing, and sends the notification to each section so that the High signal is transmitted in a period of (Td-Ta-DIFS). That is, the notification is sent to each section so as to generate a wireless LAN frame of a signal length corresponding to a length from the timing, when the first period (DIFS time) has elapsed after the reception completion timing Ta as the radio signal end timing, to the transmission end timing (transmission completion timing Td) of the High signal as the first signal.

The given period Tx is, for example, 252.2 µs, which corresponds to a total time of 50 µs of the DIFS and 202.2 µs as a minimum frame length in the case where a long preamble prescribed in IEEE 802.11b has been used.

(b-2) A case where an interval between the transmission completion timing Td and the reception completion timing Ta is equal to or less than the given period Tx, or Ta is the timing after Td:

When |Ta−Td|≦Tx or Ta>Td, the PPM signal generation section 121 compares the reception completion timing Ta with the timing (herein after, the timing Tg before the DIFS for the next transmission start) which is earlier than the transmission start timing (herein after, referred to as the next transmission timing Tf) of the High signal to be transmitted after the transmission completion timing Td by the DIFS. That is, it is compared whether the radio signal end timing is between the timing which is earlier than the transmission end timing of the first signal by the first interval and the timing which is earlier than the transmission start timing of the next first signal to be transmitted by the second interval, or whether the radio signal end timing is not later than the transmission start timing of the next first signal by the second interval.

(b-2-i) When the reception completion timing Ta is earlier than the timing Tg before the DIFS for the next transmission start, the PPM signal generation section 121 sends a notification to each section so that the High signal completely transmitted at the transmission completion timing Tc is not transmitted. That is, the High signal is replaced with the Low signal while a radio signal is received. A wireless LAN frame signal corresponding to the next first signal to be transmitted is generated without generating a wireless LAN frame signal corresponding to the first signal.

(b-2-ii) When the reception completion timing Ta is later than the timing Tg before the DIFS for the next transmission start, the PPM signal generation section 121 sends a notification to each section so that the High signal completely transmitted at the transmission completion timing Tc is not transmitted. That is, when the High signal is replaced with the Low signal while a radio signal is received. In addition, the PPM signal generation section 121 sets the transmission timing of the High signal (herein after, referred to as the next High signal) of which transmission is started at the next transmission timing Tf to the timing after the DIFS from the reception completion timing Ta. When the timing at which the next High signal is completely transmitted is set to 'Td by setting the next High signal transmission timing to the timing after the DIFS from the reception completion timing Ta, a notification is sent to each section so that the next High signal is transmitted in a period of ('Td-Ta-DIFS). That is, a wireless LAN frame signal corresponding to the next first signal (the next High signal) to be transmitted is generated without generating the wireless LAN frame signal corresponding to the High signal as the first signal. The generated wireless LAN frame signal is transmitted when the second interval (DIFS) has elapsed from the radio signal end timing.

A process before a wireless LAN frame signal is transmitted after receiving a notification from the PPM signal generation section 121 is the same as that in the wireless communication device 6 shown in FIG. 9.

As such, the wireless communication system according to the fourth embodiment has the same effect as the third embodiment. Even when the STA 3 and the AP 4 of the second communication system are communicating, the wireless communication device 8 may transmit a signal to the wireless communication device 2 by using a radio signal transmitted by the STA 3 and the AP 4.

(Fifth Embodiment)

A wireless communication system according to a fifth embodiment of the present invention will be described. The wireless communication system according to this embodiment shows an example in which the wireless communication devices 1 and 2 according to the first embodiment are applied to a notebook PC.

The wireless communication system according to this embodiment has a notebook PC 9 equipped with the wireless communication device 1 and an AC adapter 10 equipped with the wireless communication device 2.

Figure 13:
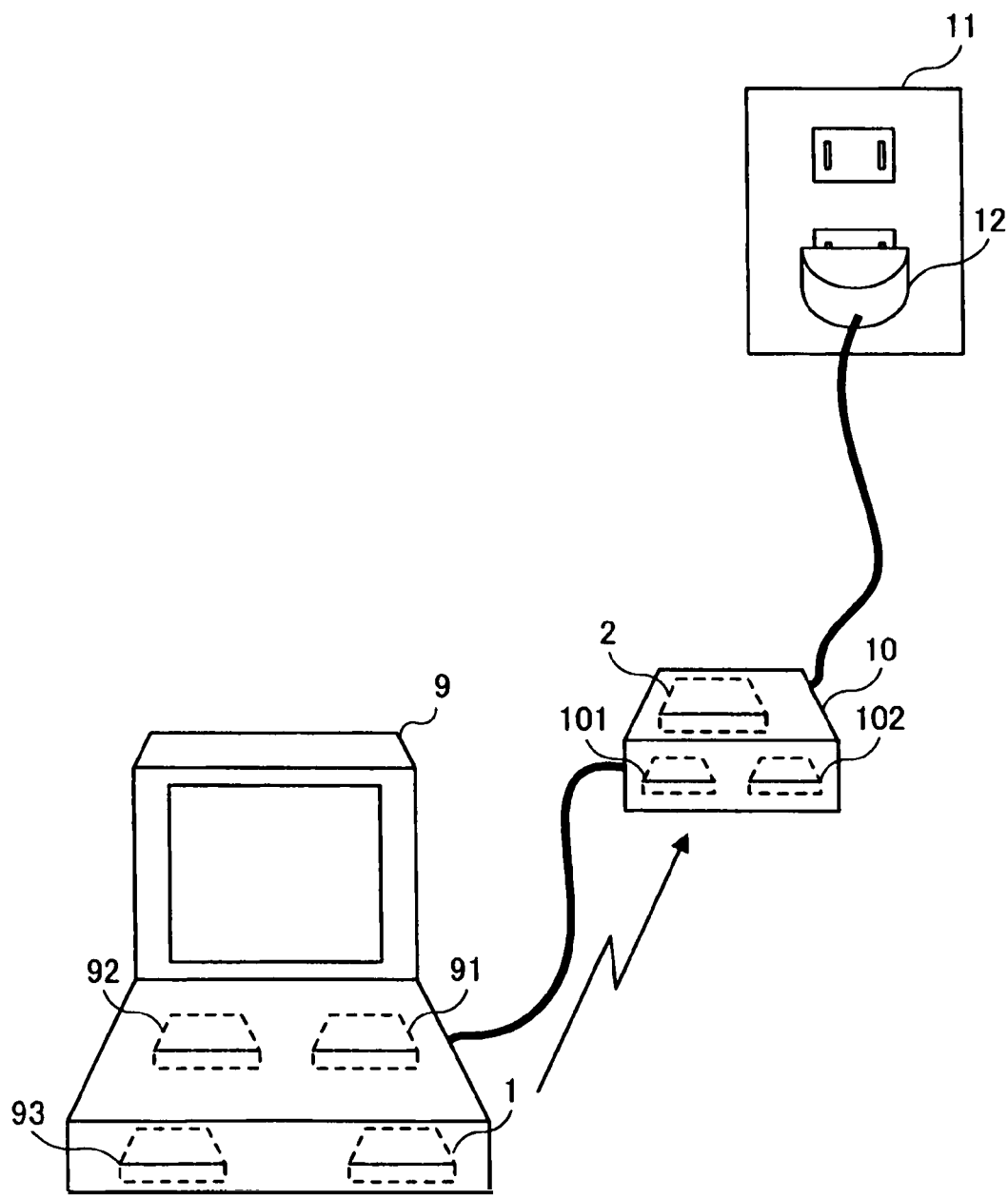
FIG. 13 is a diagram illustrating a notebook PC 9 according to a fifth embodiment of the invention.

The notebook PC 9 shown in FIG. 13 has a battery control section 92 which controls residual quantity detection for a battery 91 mounted in the notebook PC 9 and an electric charging to the battery 91, a controller 93, and the wireless communication device 1.

The battery control section 92 outputs a residual quantity of the battery 91 and outputs the detected residual quantity to the controller 93. The controller 93 compares the residual quantity of the battery with a threshold TH2, and outputs an ON control signal to the wireless communication device 1 when the residual quantity is less than the threshold TH2 as the comparison result. The controller 93 compares the battery residual quantity with a threshold TH3 and outputs an OFF control signal to the wireless communication device 1 when the battery residual quantity is greater than the threshold TH3 (0<TH2<TH3) as the comparison result.

The wireless communication device 1 generates and transmits an ON or OFF signal on the basis of the ON or OFF control signal from the controller 93. The ON or OFF signal corresponds to a radio signal to be transmitted by the wireless communication device 1 according to the first embodiment. The wireless communication device 1 is provided which is separated from a wireless communication device (not shown) mounted in the notebook PC 9. An existing wireless communication device may be used as the wireless communication device 1 according to this embodiment.

The AC adapter 10 has a transformer 101, a switch 102, and the wireless communication device 2.

The switch 102 is provided between the transformer 101 and an external power source, and connects/disconnects the transformer 101 to/from the external power source. Here, the external power source is, for example, an electric outlet 11, and the transformer 101 of the AC adaptor 10 is connected to the electric outlet 11.

The transformer 101 converts an AC signal supplied from the external power source into a DC signal. This DC signal is supplied to the battery 91.

When the ON signal is received from the wireless communication device 1, the wireless communication device 2 turns on the switch 102. Thereby, the external power source is connected to the transformer 101 and power is supplied (charged) to the battery 91. On the other hand, when the OFF signal is received from the wireless communication device 1, the wireless communication device 2 turns off the switch 102. Thereby, a connection between the transformer 101 and the external power source is released.

As such, the wireless communication system according to this embodiment may connect/disconnect the transformer 101 of the AC adaptor 10 to/from the external power source in response to the residual quantity of the notebook PC 9. Thereby, while the battery 91 is not charged, power consumption by the transformer 101 may be suppressed.

(Modified Example)

Figure 14:
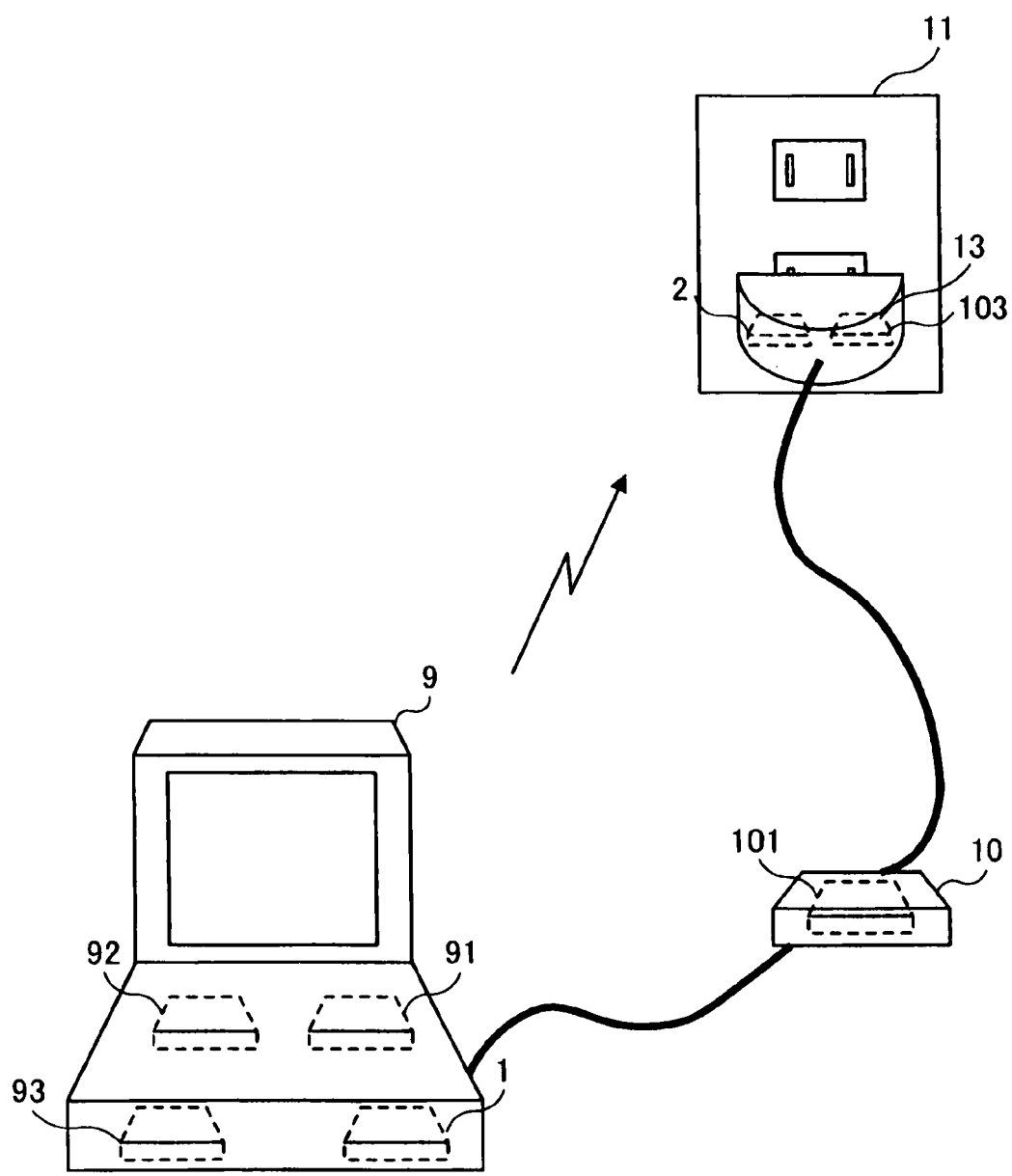
FIG. 14 is a diagram illustrating a modified example of the fifth embodiment.

A modified example according to the fifth embodiment will be described using FIG. 14. In the wireless communication system shown in FIG. 14, the wireless communication device 2 and a switch 103 are provided in an AC plug 13.

As such, even when the wireless communication device 2 and the switch 103 are provided in the AC plug 13, a connection/disconnection between the transformer 101 and the external power source may be switched by the presence/absence of charging of the battery 91 and power consumption by the transformer 101 may be suppressed.

(Sixth Embodiment)

Figure 15:
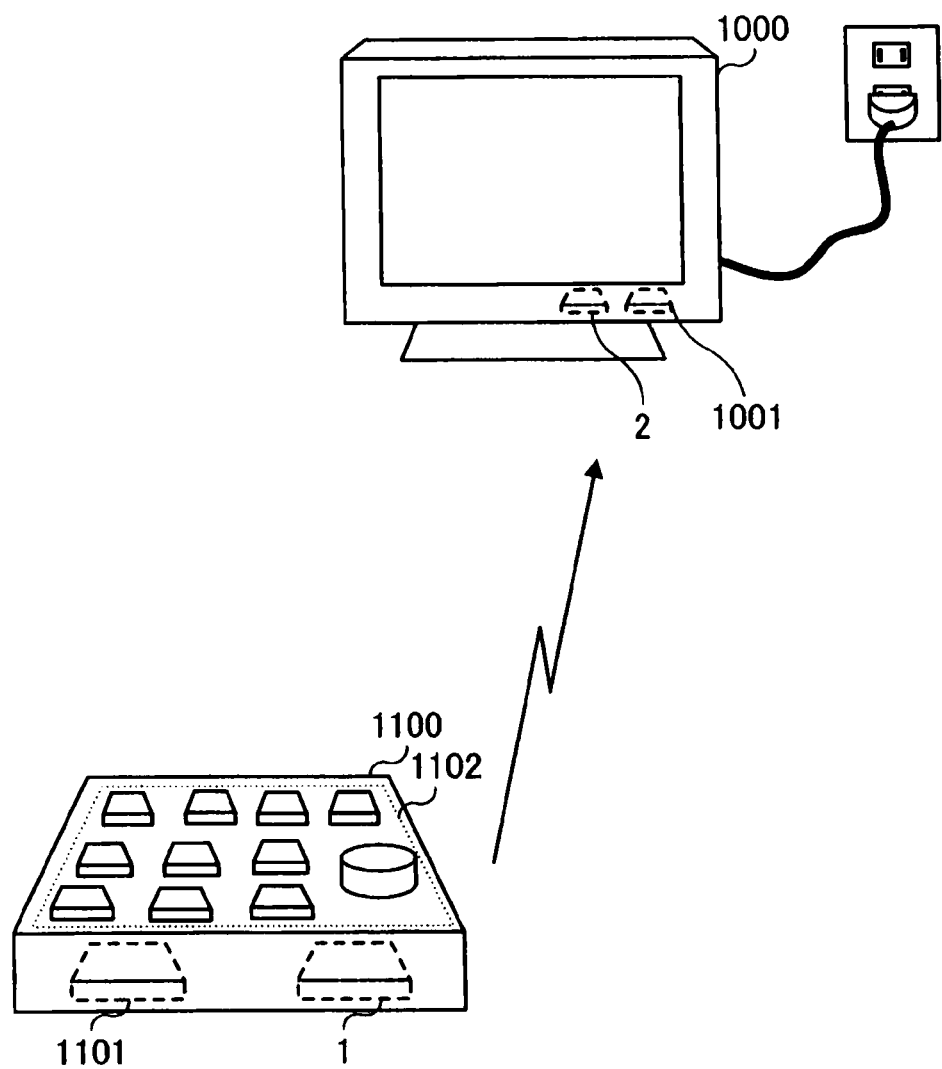
FIG. 15 is a diagram illustrating a TV according to a sixth embodiment of the invention.

An application example when the wireless communication system of FIG. 1 is applied to a TV 1000 and a remote control 1100 which controls the TV 1000 will be described using FIG. 15.

The remote control 1100 has a controller 1101, a user interface 1102, and the wireless communication device 1. The TV 1000 has a control section 1001 and the wireless communication device 2.

The controller 1101 generates a control signal in response to an input from the user interface 1102 such as a button or the like. The control signal includes a signal, which controls the TV 1000, such as a channel selection signal or a volume adjustment signal. The generated control signal is output to the wireless communication device 1.

The wireless communication device 1 transmits a radio signal on the basis of the input control signal. The radio signal includes ID information for identifying the wireless communication device 2.

The TV 1000 has the control section 1001 and the wireless communication device 2. When a radio signal is received from the wireless communication device 1, the wireless communication device 2 first demodulates ID information included in the radio signal and identifies whether or not the radio signal is a signal destined for the wireless communication device 2. When it is identified that the radio signal is destined for the wireless communication device 2 as the identification result, that is, when the ID information included in the radio signal matches ID information pre-stored in the wireless communication device 2, the received radio signal is demodulated. The wireless communication device 2 outputs the demodulation result to the control section 1001.

The control section 1001 controls various functions of the TV 1000 on the basis of the demodulation result from the wireless communication device 2. Specifically, the control section 1001 performs ON/OFF of the TV 1000, volume adjustment, and channel changeover.

As such, even when the wireless communication system according to this embodiment is applied to the TV 1000 and the remote control 1100, or even when a wireless LAN system such as a notebook PC exists nearby, the remote control 1100 may control the TV 1000 without interfering with each other.

(Seventh Embodiment)

Figure 16:
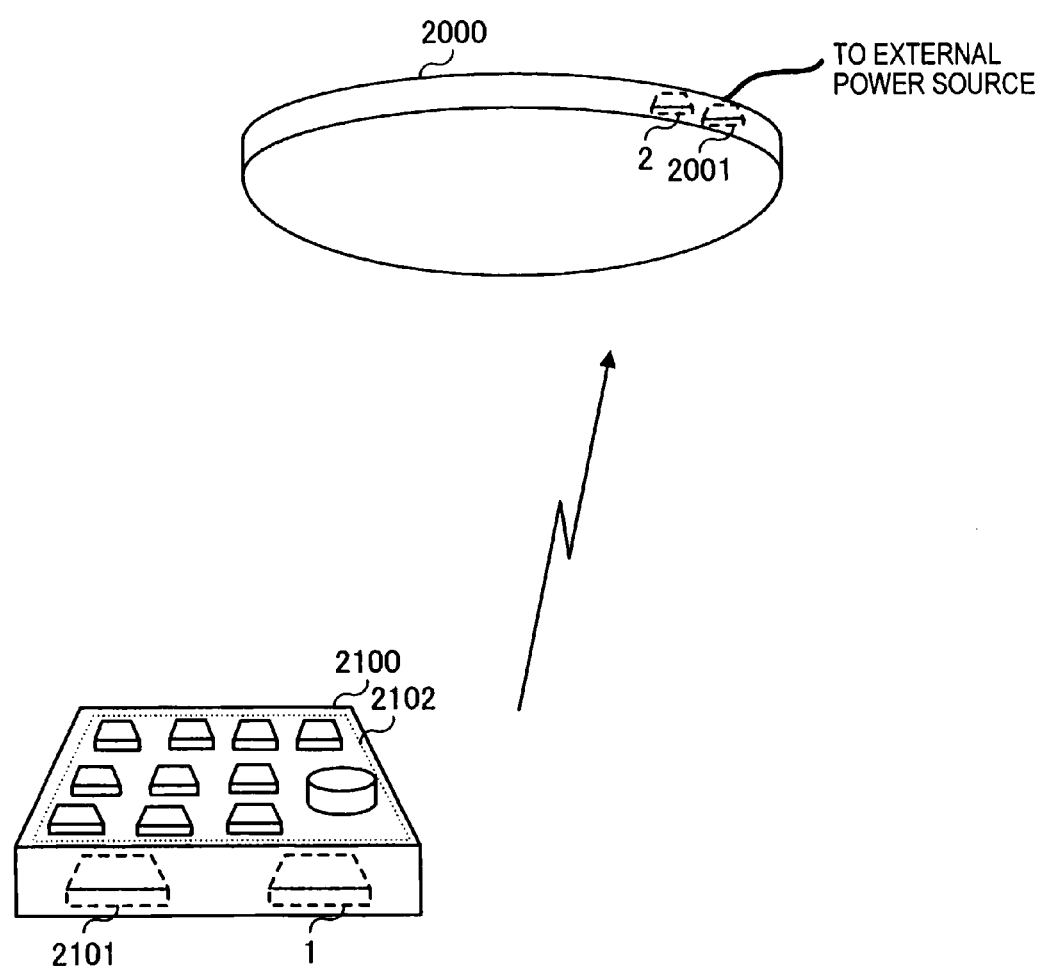
FIG. 16 is a diagram illustrating lighting equipment according to a seventh embodiment of the invention.

An application example when the wireless communication system of FIG. 1 is applied to lighting equipment 2000 and a remote control 2100 which controls the lighting equipment 2000 will be described using FIG. 16.

The remote control 2100 has a controller 2101, a user interface 2102, and the wireless communication device 1. The lighting equipment 2000 has a control section 2001 and the wireless communication device 2.

The controller 2101 generates a control signal in response to an input from the user interface 2102 such as a button or the like. The control signal includes a signal, which controls the lighting equipment 2000 for lighting ON/OFF changeover or light modulation control. The generated control signal is output to the wireless communication device 1.

The wireless communication device 1 transmits a radio signal on the basis of the input control signal. The radio signal includes ID information for identifying the wireless communication device 2.

The lighting equipment 2000 has the control section 2001 and the wireless communication device 2. When a radio signal is received from the wireless communication device 1, the wireless communication device 2 first demodulates ID information included in the radio signal and identifies whether or not the radio signal is a signal destined for the wireless communication device 2. When it is identified that the radio signal is destined for the wireless communication device 2 as the identification result, that is, when the ID information included in the radio signal matches ID information pre-stored in the wireless communication device 2, the received radio signal is demodulated. The wireless communication device 2 outputs the demodulation result to the control section 2001.

The control section 2001 controls various functions of the lighting equipment 2000 on the basis of the demodulation result from the wireless communication device 2. Specifically, the control section 2001 performs ON/OFF of the lighting equipment 2000 or light modulation control.

As such, even when the wireless communication system according to this embodiment is applied to the lighting equipment 2000 and the remote control 2100, or even when a wireless LAN system such as a notebook PC exists nearby, the remote control 2100 may control the lighting equipment 2000 without interfering with each other.

What is claimed is:

1. A wireless communication apparatus for performing communication using a first communication scheme in which data is transmitted using amplitude shift keying and a second communication scheme in which transmission suppression signals for suppressing transmission of signal from other communication apparatuses are used, wherein a frequency range used for communication according to the first communication scheme is at least partially overlapped with a frequency range used for communication according to the second communication scheme, the wireless communication apparatus comprising:
a first signal generation unit configured to generate a first transmission data;
a modulation unit configured to determine timings and signal lengths of high signals and low signals, wherein the high signals and the low signals are obtained by modulating the first transmission data by amplitude shift keying according to the first communication scheme;
a second signal generation unit configured to generate the transmission suppression signals having signal lengths substantially equal to the signal lengths of the high signals; and a transmission unit configured to transmit the transmission suppression signals according to the timings of the high signals.

2. The apparatus of claim 1, further comprising:
a calculation unit configured to calculate a period until a time corresponding to a data length of the transmission data expires after the transmission unit ends the transmission of the transmission suppression signals;
wherein the second signal generation unit generates the transmission suppression signals to suppress communication with the other communication apparatuses during the period.

3. The apparatus of claim 1,
wherein the modulation unit generates a plurality of first signals;
the second signal generation unit generates a plurality of transmission suppression signals having signal lengths respectively corresponding to signal lengths of the plurality of first signals; and
the transmission unit transmits the plurality of transmission suppression signals using different frequency bands.

4. The apparatus of claim 1, further comprising:
a signal detection configured to detect whether a radio signal has been received in a given period before the transmission suppression signals are transmitted;
wherein the transmission unit transmits the transmission suppression signals when the radio signal has not been received in the given period.

5. The apparatus of claim 4,
wherein, when the radio signal has been received in the given period, the transmission unit transmits the transmission suppression signals using frequency bands different from that of the received radio signal.

6. The apparatus of claim 4, further comprising:
a demodulation unit configured to generate reception data by demodulating the radio signal,
wherein the second signal generation unit generates the transmission suppression signals on the basis of an end timing of the radio signal calculated on the basis of the reception data.

7. The apparatus of claim 4,
wherein, when an end timing of the radio signal is earlier than a transmission end timing of the first transmission data by a certain time that is longer than a first interval, the second signal generation unit generates the transmission suppression signals, each having a signal length corresponding to a length from a first time when a first period has elapsed after the end timing of the radio signal to the transmission end timing of the first transmission data.

8. The apparatus of claim 4,
wherein, when an end timing of the radio signal is between a first timing that is earlier than a transmission end timing by a first interval and a second timing that is earlier than a transmission start timing of the next first signal to be transmitted after the first transmission data by a second interval, the second signal generation unit generates the transmission suppression signal corresponding to a next first transmission data to be transmitted after the first transmission data without generating a transmission suppression signal corresponding to the first signal.

9. The apparatus of claim 4,
wherein when an end timing of a radio signal is later than a third timing that is earlier than a transmission start timing of a next first transmission data to be transmitted after the first transmission data by a second interval, the second signal generation unit generates a transmission suppression signal corresponding to the next first signal to be transmitted after the first transmission data without generating a transmission suppression signal corresponding to the first transmission data; and
the transmission unit transmits the transmission suppression signal generated by the second signal generation unit after the second interval has elapsed from the end timing of the radio signal.

10. A wireless communication apparatus for performing communication using a first communication scheme which transmits a signal using amplitude shift keying and a second communication scheme which suppresses communication with others except a communication counterpart by transmitting a transmission suppression signal, the apparatus comprising:
a first signal generation unit configured to generate transmission data;
a modulation unit configured to generate first and second signals having different amplitudes by amplitude-shift keying the transmission data;
a second signal generation unit configured to generate the transmission suppression signal having a signal length corresponding to that of the first signal;
a transmission unit configured to transmit the transmission suppression signal based on when the first signal is transmitted; and
a signal detection configured to detect whether a radio signal has been received in a given period before the transmission suppression signal is transmitted,
wherein the transmission unit transmits the transmission suppression signal when the radio signal has not been received in the given period, and
wherein, when the radio signal has been received in the given period, the transmission unit transmits the transmission suppression signal using a frequency band different from that of the received radio signal.

11. A wireless communication apparatus for performing communication using a first communication scheme which transmits a signal using amplitude shift keying and a second communication scheme which suppresses communication with others except a communication counterpart by transmitting a transmission suppression signal, the apparatus comprising:
a first signal generation unit configured to generate transmission data;
a modulation unit configured to generate first and second signals having different amplitudes by amplitude-shift keying the transmission data;
a second signal generation unit configured to generate the transmission suppression signal having a signal length corresponding to that of the first signal;
a transmission unit configured to transmit the transmission suppression signal based on when the first signal is transmitted;
a signal detection configured to detect whether a radio signal has been received in a given period before the transmission suppression signal is transmitted, the transmission unit transmitting the transmission suppression signal when the radio signal has not been received in the given period; and
a demodulation unit configured to generate reception data by demodulating the radio signal,
wherein the second signal generation unit generates the transmission suppression signal on the basis of an end timing of the radio signal calculated on the basis of the reception data.

* * * * *